(12) United States Patent
Christy

(10) Patent No.: US 12,006,241 B2
(45) Date of Patent: *Jun. 11, 2024

(54) PROCESS FOR TREATING SEWAGE SLUDGE

(71) Applicant: RDP Technologies, Inc., Conshohocken, PA (US)

(72) Inventor: Richard W. Christy, Wayne, PA (US)

(73) Assignee: RDP TECHNOLOGIES, INC., Conshohocken, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/709,600

(22) Filed: Mar. 31, 2022

(65) Prior Publication Data

US 2022/0348488 A1 Nov. 3, 2022

Related U.S. Application Data

(63) Continuation of application No. 16/403,127, filed on May 3, 2019, now Pat. No. 11,339,071, which is a (Continued)

(51) Int. Cl.
*C02F 9/00* (2023.01)
*C02F 11/02* (2006.01)
(Continued)

(52) U.S. Cl.
CPC ................ *C02F 9/00* (2013.01); *C02F 3/12* (2013.01); *C02F 11/02* (2013.01); *C02F 11/127* (2013.01);
(Continued)

(58) Field of Classification Search
CPC .... C02F 9/00; C02F 3/12; C02F 11/02; C02F 11/127; C02F 11/145; C02F 11/185;
(Continued)

(56) References Cited

U.S. PATENT DOCUMENTS 4,053,394 A * 10/1977 Fisk .......................... C02F 3/30
210/612
4,165,281 A 8/1979 Kuriyama et al.
(Continued)

FOREIGN PATENT DOCUMENTS

CN 203128439 U * 3/2013 ............ Y02W 30/40
CN 104628233 A * 5/2015 ............ Y02W 10/30
(Continued)

OTHER PUBLICATIONS

English Translation of Wang et al Patent Publication CN203128439U, published Aug. 2013. (Year: 2013).*
(Continued)

*Primary Examiner* — Joseph W Drodge
(74) *Attorney, Agent, or Firm* — PAUL & PAUL

(57) ABSTRACT

An apparatus, method and system is provided for treating sewage sludge by dewatering the sewage sludge, heating the sewage sludge being treated to destroy pathogens, and then reducing volatile solids in the sewage sludge being treated through biochemical decomposition to produce a treated biosolids product that meets government regulations for pathogen reduction and vector attraction reduction.

14 Claims, 15 Drawing Sheets

Related U.S. Application Data continuation-in-part of application No. 15/795,934, filed on Oct. 27, 2017, now Pat. No. 10,538,446.

(60) Provisional application No. 62/414,011, filed on Oct. 28, 2016.

(51) Int. Cl.
| | | |
|---|---|---|
| *C02F 11/12* | (2019.01) | |
| *C02F 11/14* | (2019.01) | |
| *C02F 11/18* | (2006.01) | |
| *C02F 3/12* | (2023.01) | |
| *C02F 11/127* | (2019.01) | |
| *C02F 11/145* | (2019.01) | |

(52) U.S. Cl.
CPC ........... *C02F 11/145* (2019.01); *C02F 11/185* (2013.01); *C02F 2303/02* (2013.01); *C02F 2303/04* (2013.01)

(58) Field of Classification Search
CPC .. C02F 2303/02; C02F 2303/04; C02F 11/06; C02F 11/12; C02F 11/121; C02F 11/123; C02F 11/143; C02F 11/16; C02F 11/13; C02F 3/02; C02F 3/1205; C02F 3/121; C02F 11/126; C02F 11/18; Y02W 10/10; Y02W 10/20
See application file for complete search history.

(56) References Cited

U.S. PATENT DOCUMENTS

| | | |
|---|---|---|
| 4,902,431 A | 2/1990 | Nicholson et al. |
| 5,013,458 A | 5/1991 | Christy, Sr. et al. |
| 5,186,840 A | 2/1993 | Christy et al. |
| 5,229,011 A | 7/1993 | Christy, Sr. et al. |
| 5,405,536 A | 4/1995 | Christy |
| 5,433,844 A | 7/1995 | Christy |
| 5,470,472 A | 11/1995 | Baird et al. |
| 5,554,279 A | 9/1996 | Christy |
| 5,681,481 A | 10/1997 | Christy et al. |
| 6,395,174 B1 | 5/2002 | Teran et al. |
| 6,790,349 B1 | 9/2004 | Sawyer |
| 6,994,016 B1 | 2/2006 | Bunker et al. |
| 10,538,446 B2 | 1/2020 | Christy |
| 11,339,071 B2* | 5/2022 | Christy ............... C02F 11/123 |
| 2003/0136731 A1* | 7/2003 | Mandt ................ C02F 3/1263 |
| | | 210/605 |
| 2004/0004038 A1* | 1/2004 | Yamaguchi ......... C02F 3/1221 |
| | | 210/623 |
| 2004/0164019 A1* | 8/2004 | Fassbender .............. C02F 1/02 |
| | | 210/603 |
| 2005/0145566 A1* | 7/2005 | Haase .................. C02F 11/148 |
| | | 210/620 |
| 2012/0228217 A1* | 9/2012 | Li .......................... C02F 3/30 |
| | | 210/151 |
| 2013/0105376 A1 | 5/2013 | Van Vliet et al. |
| 2013/0140231 A1* | 6/2013 | Novak .................... C02F 3/301 |
| | | 210/603 |
| 2013/0174438 A1 | 7/2013 | Moarn et al. |
| 2013/0213883 A1* | 8/2013 | Josse ...................... C02F 3/302 |
| | | 210/601 |
| 2014/0048463 A1* | 2/2014 | Weisselberg .......... C02F 11/13 |
| | | 210/175 |
| 2018/0118599 A1 | 5/2018 | Christy |

FOREIGN PATENT DOCUMENTS

| | | | | |
|---|---|---|---|---|
| GB | 2285043 A | * | 6/1995 | .............. C05F 7/00 |
| WO | WO2005063946 A1 | * | 7/2005 | ............. C02F 11/10 |

OTHER PUBLICATIONS

English Translation of Lv et al Patent Publication CN104628233A, published May 2015. (Year: 2015).*

* cited by examiner

PROCESS FOR TREATING SEWAGE SLUDGE

CROSS-REFERENCE TO RELATED APPLICATIONS

This application is a continuation of U.S. patent application Ser. 16/403,127, filed May 3, 2019, which is a continuation-in-part of U.S. patent application Ser. No. 15/795,934 filed Oct. 27, 2017, now U.S. Pat. No. 10,538,446, issued Jan. 21, 2020, which claims the priority of U.S. Provisional Patent Application 62/414,011, filed Oct. 28, 2016, all of which are incorporated herein in their entirety by reference.

BACKGROUND OF THE INVENTION

It is known in the art of processing sewage sludge to render the sludge safe and sanitary by various techniques, a number of which have been approved by the Environmental Protection Agency EPA, which agency has developed regulations for proper treatment and disposal of sewage sludge.

The goal of treating sewage sludge is to neutralize pathogens to an environmentally safe level and to reduce vector attractiveness; i.e., to make the sewage sludge unattractive to rats, mice, flies, birds, etc., which could serve as vectors for bringing the pathogens in sewage sludge into contact with humans and thus pose a risk to human health.

Various apparatus and methods for killing pathogens and reducing vector attractiveness have been developed and some examples of such apparatus and methods are set forth in U.S. Pat. Nos. 5,013,458, 5,229,011, 5,186,840, 5,405,536, 5,433,844, 5,554,279, and 5,681,481, the complete disclosures of all of which are incorporated herein by reference.

Some previous developments in the treatment of sewage sludge have sought to inexpensively stabilize the sludge through lime addition. These systems sometimes produced objectionable odors, dust and steam while producing an end product that was of a pasty consistency and therefore difficult to handle often requiring specialized spreading equipment, for spreading the resultant treated waste on land. Additionally, with some prior art systems, objectionable odors have prevented the wider adoption of these systems.

Other processes used for treating sewage sludge include composting. These processes require the addition of bulking agents to the sewage sludge in preparation for the composting process. Frequently, the bulking agents need to be removed using specialized equipment before the resulting treated biosolids can be land applied, thus increasing the cost and complexity of the treatment process.

In accordance with the existing developed technology, drying apparatus of various forms have been used to stabilize sewage sludge and produce a granular end product that appeared to be satisfactory, but was so extremely dry, for example in excess of 90% dry solids, such that the end product was often dusty and difficult to handle. Such processes and equipment lacked the ability to determine the solids concentration with the required degree of precision, in that they simply evaporated water until the product became very dry.

Additionally, some current apparatus and processes that are in use often estimate the moisture content of the final product in an indirect manner, using indirect measurements or timers. Consequently, the material being processed is dried until the temperature of the medium providing the heat increases rapidly, providing an indication that all of the moisture has been removed from the product. Thus, in such processes and equipment, the processing of the batch is then considered to be complete, although it can be extremely dry and difficult to handle.

SUMMARY OF THE INVENTION

The objectives of sewage treatment are as follows:
1. Protect public health;
2. Produce a stable product free of objectionable odors; and
3. Produce a product that benefits civilization.

If the product of sewage treatment has enough benefits to society such that the demand for the product equals or is greater than the supply, then the environmental impact of the sewage produced by humans could be minimized.

If every person would take responsibility for reducing their environmental and ecological footprint, we could help reverse climate change and create a sustainable and regenerative community. One way that people can reduce their environmental impact is for sewage treatment to produce a product that can be put to beneficial use around the community.

The process of the present invention produces an end product that directly positively improves soil health. Improved soil health quantifiably increases sequestration of carbon into the soils from the atmosphere and can help reverse climate change.

The process of the present invention seeks to transform sewage sludge into a unique product having a combination features including being more nutrient rich and more balanced, and being capable of increasing the organic content of soil while also providing micro and macro nutrients, as well as trace metals such as iron, zinc, copper, manganese, cobalt, nickel, boron, and molybdenum. The end product of the treatment process according to the invention is a substantially aerobic microbial material consisting of active and decaying microorganisms, which is derived from sewage sludge without the need for bulking agents or amendments. Using the treatment process of the present invention, a higher quality biosolids product than is currently available can be produced. A high quality product, at a lower cost, and in a more useful form should increase demand within the community for the product of sewage treatment, which can be achieved when sewage treatment processes according to the present invention are employed.

The sewage treatment process of the present invention is a unique combination of biochemical and thermal conditioning combined with dewatering of sewage sludge before aerobic digestion. The process takes a holistic approach to producing a high quality biosolids product. The focus is preventing odors within a small footprint through preconditioning prior to an Advanced Aerobic Digestion Process (AADP). The process starts prior to dewatering and continues through curing. The sewage treatment process of the present invention transforms sewage sludge into a form that enhances soil health by providing a diverse, active, substantially aerobic material consisting of active and decaying microorganisms. The characteristics of the finished product are tailored to improve the water holding capacity of the soil and to provide a unique combination of micronutrients, macronutrients and trace metals in a relatively balanced ratio. The nutrients are in a bioavailable form leading to rapid uptake into the root systems of plants. Sources of these nutrients can come from the recovery of societal byproducts such as sewage sludge but can also be blended with wood ash, coal ash, and cement kiln dust. Other societal organics like fats, oils, grease and food waste can also be used along with the sewage sludge. To further enhance microbial growth inoculants could be added. The product can also be trimmed to adjust the soil pH up or down to optimize microbial and plant growth for site specific conditions.

The present invention includes an integrated system of engineered sub systems combining elements of thermal and/or chemical and/or aerobic conditioning that leads to the lysing of cell walls, prior to aerobic digestion of a semi solid.

The thermal, chemical, and biological elements of the process work in concert with each other to produce a unique product with quantifiably superior process performance. The process of the present invention provides the following benefits:
1. Volatile solids reduction by at least 38%;
2. High level of pathogen destruction at least meeting the EPA requirements for a class A biosolids product;
3. Provides a product that increase moisture holding capacity of soil by up to 25% or more;
4. Provides a nutrient rich product contains micronutrients, macronutrients, and trace metals such as iron, zinc, copper, manganese, cobalt, nickel, boron, and molybdenum;
5. A substantially organic process that provides a product with micro and macronutrients in a Bioavailable form as a result of the aerobic digestion of a dewatered sludge cake;
6. Provides a product that is friable and easy to handle with sufficient porosity to sustain aerobic microbial activity;
7. A process substantially free of nuisance odors by providing more complete volatile solids reduction; and
8. Increased sequestration of carbon into the soil by increasing soil health through increased biomass, which will increase carbon sequestration from the atmosphere.

In the process of the present invention, the dewatered sewage sludge or cake is heated to meet or exceed the requirements of EPA Regulations Part 503 in accordance with Equation 2 of section 503.32 for at least the period of time required by those regulations. Equation 2 is as follows:

$$D = \frac{131,700,000}{10^{0.1400t}}$$

Where D is time in days and t is the temperature in degrees Celsius.

The heated cake can also be further conditioned to reduce objectionable odors and/or further enhance the weakening or lysing of pathogen cell walls. As the cell walls are weakened more food is made more readily available to the microbes responsible for Advanced Aerobic Digestion. In the subsequent digestion step the rate of digestion and the overall magnitude are increased resulting in faster and more complete digestion than previous methods because of the preconditioning prior to digestion of the dewatered sludge cake. This provides a more efficient method of producing a Class A quality product without objectionable odors and/or the need for bulking agents.

The absence of a bulking agent also results in a higher density of nutrients than the product of prior treatment processes with no increase in volume, again providing a more efficient process without objectionable odors. If needed to reduce odors the sewage sludge can also be preconditioned prior to dewatering.

The present invention provides an apparatus, process and system for treating sewage sludge to produce a treated biosolids product that can meet government regulations for disposal and/or beneficial use. The method of the present invention includes the steps of dewatering the sewage sludge, heating the sewage sludge being treated to destroy pathogens, optionally also chemically treating the dewatered sludge to further assist in lysing pathogen cell walls and make the biological matter inside the pathogen cells more readily available for subsequent biochemical decomposition, and then reducing volatile solids in the sewage sludge being treated through biochemical decomposition to produce a treated biosolids product that meets government regulations for pathogen reduction and vector attraction reduction. The process of the present invention allows the use of chemical treating agents such as alkaline, acidic, or oxidizing agents to be avoided if desired, while still meeting government regulations for pathogen and volatile solids reduction. However, chemical treating agents may be beneficially used in conjunction with heating to more efficiently lyse the cell walls of the pathogenic and other organisms to make the biological matter in the pathogens more readily available to the biochemical decomposition process. The present invention also allows the use of bulking agents to be avoided if desired.

Accordingly, it is an aspect of the present invention to provide a process for treating sewage sludge that includes the steps of dewatering the sewage sludge, heating the sewage sludge being treated to destroy pathogens, and then reducing volatile solids in the sewage sludge being treated through biochemical decomposition in order to produce a treated biosolids product that meets government regulations for pathogen reduction and vector attraction reduction.

It is still another aspect of the present invention to provide a process for treating sewage sludge comprising the steps of:
dewatering the sewage sludge to obtain a dewatered sewage sludge; and
heating the dewatered sewage sludge to obtain a heated, dewatered sewage sludge; and
subjecting the heated, dewatered sewage sludge to an aerobic biochemical decomposition process to produce a decomposition process product,
wherein the step of subjecting the heated, dewatered sewage sludge to an aerobic biochemical decomposition process takes place in a vessel, and wherein the step of heating the dewatered sewage sludge takes place in the same vessel.

It is yet another aspect of the present invention to provide a process for treating sewage sludge incorporating any one or any combination of the various aspects of the present invention described above, wherein the step of dewatering the sewage sludge produces a dewatered sewage sludge that is composed of from about 15 percent to about 50 percent dry solids.

It is yet another aspect of the present invention to provide a process for treating sewage sludge incorporating any one or any combination of the various aspects of the present invention described herein, wherein the dewatered and heated sewage sludge is mixed with at least a portion of the decomposition process product before being subjected to the aerobic biochemical decomposition process.

It is yet another aspect of the present invention to provide a process for treating sewage sludge incorporating any one or any combination of the various aspects of the present invention described herein, wherein the sewage sludge has a volatile solids content, and wherein the treated biosolids product has a volatile solids content that meets government regulatory requirements for vector attraction reduction such that the decomposition process product can be classified as a treated biosolids product.

It is yet another aspect of the present invention to provide a process for treating sewage sludge incorporating any one or any combination of the various aspects of the present invention described herein, wherein the sewage sludge has a volatile solids content, and wherein the decomposition process product has a volatile solids content that is at least 38 percent by weight less than the volatile solids content of the sewage sludge.

It is yet another aspect of the present invention to provide a process for treating sewage sludge incorporating any one or any combination of the various aspects of the present invention described herein, wherein the aerobic biochemical decomposition process is aerobic digestion.

It is yet another aspect of the present invention to provide a process for treating sewage sludge incorporating any one or any combination of the various aspects of the present invention described herein, wherein the aerobic biochemical decomposition process is in-vessel, agitated bed composting.

It is yet another aspect of the present invention to provide a process for treating sewage sludge incorporating any one or any combination of the various aspects of the present invention described herein, wherein the aerobic biochemical decomposition process is a highly efficient aerobic digestion process.

It is yet another aspect of the present invention to provide a process for treating sewage sludge incorporating any one or any combination of the various aspects of the present invention described herein, wherein the step of heating the dewatered sewage sludge is accomplished by a step of pasteurizing the dewatered sewage sludge utilizing a pasteurization process.

It is yet another aspect of the present invention to provide a process for treating sewage sludge incorporating any one or any combination of the various aspects of the present invention described herein, wherein the step of heating or pasteurizing the dewatered sewage sludge is accomplished by maintaining the dewatered sewage sludge at a temperature of at least 70° C. for at least 30 minutes.

It is yet another aspect of the present invention to provide a process for treating sewage sludge incorporating any one or any combination of the various aspects of the present invention described herein, wherein the step of heating or pasteurizing the dewatered sewage sludge is accomplished by maintaining the dewatered sewage sludge at a temperature in the range of from at least 70° C. to at most 100° C. for at least 30 minutes.

It is yet another aspect of the present invention to provide a process for treating sewage sludge incorporating any one or any combination of the various aspects of the present invention described herein, wherein the step of heating or pasteurizing the dewatered sewage sludge is performed at atmospheric pressure.

It is yet another aspect of the present invention to provide a process for treating sewage sludge incorporating any one or any combination of the various aspects of the present invention described herein, wherein the step of dewatering, the step of heating the dewatered sewage sludge, and the step of subjecting the dewatered, heated sewage sludge to a biochemical decomposition process all take place in the same vessel.

It is yet another aspect of the present invention to provide a process for treating sewage sludge incorporating any one or any combination of the various aspects of the present invention described herein, wherein the step of heating the sewage sludge derived material being treated takes place before the step of subjecting the sewage sludge derived material being treated to an aerobic biochemical decomposition process.

It is yet another aspect of the present invention to provide a process for treating sewage sludge incorporating any one or any combination of the various aspects of the present invention described herein, wherein the process further comprises cooling the heated, dewatered sewage sludge before subjecting the dewatered, heated sewage sludge to a biochemical decomposition process.

It is yet another aspect of the present invention to provide a process for treating sewage sludge incorporating any one or any combination of the various aspects of the present invention described herein, wherein the treated biosolids product is composed of from more than 10 percent to less than 90 percent dry solids.

It is yet another aspect of the present invention to provide a process for treating sewage sludge incorporating any one or any combination of the various aspects of the present invention described herein, wherein the treated biosolids product is composed of from about 15 percent to about 85 percent dry solids.

It is yet another aspect of the present invention to provide a process for treating sewage sludge incorporating any one or any combination of the various aspects of the present invention described herein, wherein the treated biosolids product is composed of from about 50 percent to about 75 percent dry solids.

It is yet another aspect of the present invention to provide a process for treating sewage sludge incorporating any one or any combination of the various aspects of the present invention described herein, wherein the treated biosolids product is composed of from about 55 percent to about 70 percent dry solids.

It is yet another aspect of the present invention to provide a process for treating sewage sludge incorporating any one or any combination of the various aspects of the present invention described herein, wherein no addition of slaked lime or quick lime takes place after the step of dewatering the sewage sludge.

It is yet another aspect of the present invention to provide a process for treating sewage sludge incorporating any one or any combination of the various aspects of the present invention described herein, wherein each of the steps in the process for treating sewage sludge has been, is to be, or is being applied to a process material at any given point in the process, the process material comprising one or more of the sewage sludge, the dewatered sewage sludge, the decomposition process product, and the heated, dewatered sewage sludge depending upon the step or steps of the process most recently completed or being performed, wherein the process material has a pH, and wherein the pH of the process material is less than 10 at all times during the process.

It is yet another aspect of the present invention to provide a process for treating sewage sludge incorporating any one or any combination of the various aspects of the present invention described herein, wherein each of the steps in the process for treating sewage sludge has been, is to be, or is being applied to a process material at any given point in the process, the process material comprising one or more of the sewage sludge, the dewatered sewage sludge, the decomposition process product, and the heated, dewatered sewage sludge depending upon the step or steps of the process most recently completed or being performed, wherein the process material has a pH, and wherein the pH of the process material is less than 12 at all times during the process.

It is yet another aspect of the present invention to provide a process for treating sewage sludge incorporating any one or any combination of the various aspects of the present invention described herein, wherein the vessel is of the rotary drum type and has a heated agitator.

It is yet another aspect of the present invention to provide a process for treating sewage sludge incorporating any one or any combination of the various aspects of the present invention described herein, wherein the vessel has a heated agitator.

It is yet another aspect of the present invention to provide a process for treating sewage sludge incorporating any one or any combination of the various aspects of the present invention described herein, wherein the vessel has a wall and has facility for heating material contained in the vessel through the wall of the vessel.

It is yet another aspect of the present invention to provide a process for treating sewage sludge incorporating any one or any combination of the various aspects of the present invention described herein, wherein the vessel is electrically heated.

It is yet another aspect of the present invention to provide a process for treating sewage sludge incorporating any one or any combination of the various aspects of the present invention described herein, wherein the vessel has a jacket surrounding the wall and a heat transfer medium is circulated through the jacket for heating material contained in the vessel.

It is yet another aspect of the present invention to provide a vessel that can be used to perform both the step of biochemically decomposing the material being treated and heating the material being treated to reduce pathogens to required levels.

It is yet another aspect of the present invention to provide a vessel that incorporates heating means, aerating means, and agitating means so as to be capable of performing both the step of biochemically decomposing the material being treated and heating the material being treated to reduce pathogens to required levels.

It is yet another aspect of the present invention to provide a vessel that can be used to perform both the step of biochemically decomposing the material being treated and heating the material being treated to reduce pathogens to required levels, wherein the aerating means includes a blower or a suction pump.

It is yet another aspect of the present invention to provide a vessel that can be used to perform both the step of biochemically decomposing the material being treated and heating the material being treated to reduce pathogens to required levels, wherein the agitating means includes rotating paddles and/or plates.

It is yet another aspect of the present invention to provide a vessel that can be used to perform both the step of biochemically decomposing the material being treated and heating the material being treated to reduce pathogens to required levels, wherein the agitating means includes a rotating drum.

It is yet another aspect of the present invention to provide a vessel that can be used to perform both the step of biochemically decomposing the material being treated and heating the material being treated to reduce pathogens to required levels, wherein the agitating means includes a rotating drum with internal vanes.

It is yet another aspect of the present invention to provide a vessel that can be used to perform both the step of biochemically decomposing the material being treated and heating the material being treated to reduce pathogens to required levels, wherein the agitating means includes a rotating drum with internal radial vanes.

It is yet another aspect of the present invention to provide a vessel that can be used to perform both the step of biochemically decomposing the material being treated and heating the material being treated to reduce pathogens to required levels, wherein the heating means includes an electrical heating element.

It is yet another aspect of the present invention to provide a vessel that can be used to perform both the step of biochemically decomposing the material being treated and heating the material being treated to reduce pathogens to required levels, wherein the heating means employs a heat transfer medium.

It is yet another aspect of the present invention to provide a vessel that can be used to perform both the step of biochemically decomposing the material being treated and heating the material being treated to reduce pathogens to required levels, wherein the heating means includes an electrically heated agitator.

It is yet another aspect of the present invention to provide a vessel that can be used to perform both the step of biochemically decomposing the material being treated and heating the material being treated to reduce pathogens to required levels, wherein the heating means includes a hollow agitator through which a heat transfer medium is circulated.

It is yet another aspect of the present invention to provide a vessel that can be used to perform both the step of biochemically decomposing the material being treated and heating the material being treated to reduce pathogens to required levels, wherein the heating means includes an electrically heated vessel wall.

It is yet another aspect of the present invention to provide a vessel that can be used to perform both the step of biochemically decomposing the material being treated and heating the material being treated to reduce pathogens to required levels, wherein the heating means includes a hollow jacket around the vessel wall through which a heat transfer medium is circulated.

It is an aspect of the present invention to provide a process for treating sewage sludge comprising the steps of:
  dewatering the sewage sludge to obtain a dewatered sewage sludge; and
  heating the dewatered sewage sludge to obtain a thermally treated and dewatered sewage sludge; and
  subjecting the thermally treated and dewatered sewage sludge to an aerobic biochemical decomposition process to obtain a decomposition process product.

It is yet another aspect of the present invention to provide a process for treating sewage sludge in accordance with any of the aspects of the present invention described herein, wherein the step of dewatering the sewage sludge produces a dewatered sewage sludge that is composed of from about 13 percent to about 40 percent dry solids.

It is yet another aspect of the present invention to provide a process for treating sewage sludge in accordance with any of the aspects of the present invention described herein, wherein the thermally treated and dewatered sewage sludge is mixed with at least a portion of the decomposition process product before being subjected to the aerobic biochemical decomposition process.

It is yet another aspect of the present invention to provide a process for treating sewage sludge in accordance with any of the aspects of the present invention described herein, wherein the sewage sludge has a volatile solids content, and wherein the decomposition process product has a volatile solids content that meets government regulatory requirements for vector attraction reduction such that the decomposition process product can be classified as a treated biosolids product.

It is yet another aspect of the present invention to provide a process for treating sewage sludge in accordance with any of the aspects of the present invention described herein, wherein the step of heating the dewatered sewage sludge takes place in a vessel and the step of subjecting the thermally treated and dewatered sewage sludge to an aerobic biochemical decomposition process takes place in the same vessel.

It is yet another aspect of the present invention to provide a process for treating sewage sludge in accordance with any of the aspects of the present invention described herein, wherein the process further comprises cooling the decomposition process product to obtain a treated biosolids product.

It is yet another aspect of the present invention to provide a process for treating sewage sludge in accordance with any of the aspects of the present invention described herein, wherein the decomposition process product is composed of from about 55 percent to about 70 percent dry solids.

It is yet another aspect of the present invention to provide a process for treating sewage sludge in accordance with any of the aspects of the present invention described herein, wherein no addition of slaked lime or quick lime takes place after the step of dewatering the sewage sludge.

It is yet another aspect of the present invention to provide a process for treating sewage sludge in accordance with any of the aspects of the present invention described herein, wherein each of the steps in the process for treating sewage sludge has been, is to be, or is being applied to a process material at any given point in the process, the process material comprising one or more of the sewage sludge, the dewatered sewage sludge, the decomposition process product, and the thermally treated and dewatered sewage sludge depending upon the step or steps of the process most recently completed or being performed, wherein the process material has a pH, and wherein the pH of the process material is about 10 or less at all times during the process.

It is yet another aspect of the present invention to provide a process for treating sewage sludge in accordance with any of the aspects of the present invention described herein, wherein the pH of the process material is less than 10 at all times during the process.

It is yet another aspect of the present invention to provide a process for treating sewage sludge in accordance with any of the aspects of the present invention described herein, wherein each of the steps in the process for treating sewage sludge has been, is to be, or is being applied to a process material at any given point in the process, the process material comprising one or more of the sewage sludge, the dewatered sewage sludge, the decomposition process product, and the heated decomposition process product depending upon the step or steps of the process most recently completed or being performed, wherein the process material has a pH, and wherein the pH of the process material is less than 12 at all times during the process.

It is yet another aspect of the present invention to provide a process for treating sewage sludge in accordance with any of the aspects of the present invention described herein, wherein the vessel is of the rotary drum type and has a heated agitator.

It is yet another aspect of the present invention to provide a process for treating sewage sludge in accordance with any of the aspects of the present invention described herein, wherein the vessel has a heated agitator.

It is yet another aspect of the present invention to provide a process for treating sewage sludge in accordance with any of the aspects of the present invention described herein, wherein the vessel has a wall and has facility for heating material contained in the vessel through the wall of the vessel.

It is yet another aspect of the present invention to provide a process for treating sewage sludge in accordance with any of the aspects of the present invention described herein, wherein the vessel is electrically heated.

It is yet another aspect of the present invention to provide a process for treating sewage sludge in accordance with any of the aspects of the present invention described herein, wherein the vessel has a jacket surrounding the wall and a heat transfer medium is circulated through the jacket for heating material contained in the vessel.

It is an aspect of the present invention to provide a process for treating sewage sludge comprising the steps of:
  dewatering the sewage sludge to obtain a dewatered sewage sludge; and
  heating the dewatered sewage sludge to obtain a thermally treated and dewatered sewage sludge; and
  subjecting the thermally treated and dewatered sewage sludge to an aerobic biochemical decomposition process to produce a decomposition process product,
  wherein the step of subjecting the thermally treated and dewatered sewage sludge to an aerobic biochemical decomposition process takes place in a vessel, and wherein the step of heating the dewatered sewage sludge takes place in the same vessel.

It is yet another aspect of the present invention to provide a process for treating sewage sludge in accordance with any of the aspects of the present invention described herein, wherein the step of dewatering the sewage sludge produces a dewatered sewage sludge that is composed of from about 13 percent to about 40 percent dry solids.

It is yet another aspect of the present invention to provide a process for treating sewage sludge in accordance with any of the aspects of the present invention described herein, wherein the thermally treated and dewatered sewage sludge is mixed with at least a portion of the decomposition process product before being subjected to the aerobic biochemical decomposition process.

It is yet another aspect of the present invention to provide a process for treating sewage sludge in accordance with any of the aspects of the present invention described herein, wherein the sewage sludge has a volatile solids content, and wherein the decomposition process product has a volatile solids content that meets government regulatory requirements for vector attraction reduction such that the decomposition process product can be classified as a treated biosolids product.

It is yet another aspect of the present invention to provide a process for treating sewage sludge in accordance with any of the aspects of the present invention described herein, wherein the sewage sludge has a volatile solids content, and wherein the decomposition process product has a volatile solids content that is at least 38 percent by weight less than the volatile solids content of the sewage sludge.

It is yet another aspect of the present invention to provide a process for treating sewage sludge in accordance with any of the aspects of the present invention described herein, wherein the aerobic biochemical decomposition process is aerobic digestion.

It is yet another aspect of the present invention to provide a process for treating sewage sludge in accordance with any of the aspects of the present invention described herein, wherein the step of heating the dewatered sewage sludge is accomplished by a step of pasteurizing the dewatered sewage sludge utilizing a pasteurization process.

It is yet another aspect of the present invention to provide a process for treating sewage sludge in accordance with any of the aspects of the present invention described herein, wherein the step of pasteurizing the dewatered sewage sludge is accomplished by maintaining the dewatered sewage sludge at a temperature of at least 70° C. for at least 30 minutes.

It is yet another aspect of the present invention to provide a process for treating sewage sludge in accordance with any of the aspects of the present invention described herein, wherein the step of pasteurizing the dewatered sewage sludge is accomplished by maintaining the dewatered sewage sludge at a temperature in the range of from at least 70° C. to at most 100° C. for at least 30 minutes.

It is yet another aspect of the present invention to provide a process for treating sewage sludge in accordance with any of the aspects of the present invention described herein, wherein the step of pasteurizing the dewatered sewage sludge is performed at atmospheric pressure.

It is yet another aspect of the present invention to provide a process for treating sewage sludge in accordance with any of the aspects of the present invention described herein, wherein the step of subjecting the thermally treated and dewatered sewage sludge to an aerobic biochemical decomposition process takes place after the step of heating the dewatered sewage sludge.

It is yet another aspect of the present invention to provide a process for treating sewage sludge in accordance with any of the aspects of the present invention described herein, wherein the process further comprises curing the decomposition process product to obtain a treated biosolids product.

It is yet another aspect of the present invention to provide a process for treating sewage sludge in accordance with any of the aspects of the present invention described herein, wherein the decomposition process product is composed of from about 55 percent to about 70 percent dry solids.

It is yet another aspect of the present invention to provide a process for treating sewage sludge in accordance with any of the aspects of the present invention described herein, wherein no addition of slaked lime or quick lime takes place after the step of dewatering the sewage sludge.

It is yet another aspect of the present invention to provide a process for treating sewage sludge in accordance with any of the aspects of the present invention described herein, wherein each of the steps in the process for treating sewage sludge has been, is to be, or is being applied to a process material at any given point in the process, the process material comprising one or more of the sewage sludge, the dewatered sewage sludge, the heated, dewatered sewage sludge, and the decomposition process product depending upon the step or steps of the process most recently completed or being performed, wherein the process material has a pH, and wherein the pH of the process material is about 10 or less at all times during the process.

It is yet another aspect of the present invention to provide a process for treating sewage sludge in accordance with any of the aspects of the present invention described herein, wherein each of the steps in the process for treating sewage sludge has been, is to be, or is being applied to a process material at any given point in the process, the process material comprising one or more of the sewage sludge, the dewatered sewage sludge, the heated, dewatered sewage sludge, and the decomposition process product depending upon the step or steps of the process most recently completed or being performed, wherein the process material has a pH, and wherein the pH of the process material is less than 12 at all times during the process.

It is yet another aspect of the present invention to provide a process for treating sewage sludge in accordance with any of the aspects of the present invention described herein, wherein the vessel is of the rotary drum type and has a heated agitator.

It is yet another aspect of the present invention to provide a process for treating sewage sludge in accordance with any of the aspects of the present invention described herein, wherein the vessel has a heated agitator.

It is yet another aspect of the present invention to provide a process for treating sewage sludge in accordance with any of the aspects of the present invention described herein, wherein the vessel has a wall and has facility for heating material contained in the vessel through the wall of the vessel.

It is yet another aspect of the present invention to provide a process for treating sewage sludge in accordance with any of the aspects of the present invention described herein, wherein the vessel is electrically heated.

It is yet another aspect of the present invention to provide a process for treating sewage sludge in accordance with any of the aspects of the present invention described herein, wherein the vessel has a jacket surrounding the wall and a heat transfer medium is circulated through the jacket for heating material contained in the vessel.

It is yet another aspect of the present invention to provide a process for treating sewage sludge in accordance with any of the aspects of the present invention described herein, further comprising the steps of:
    accumulating a quantity of the sewage sludge in a holding tank prior to the step of dewatering the sewage sludge; and
    aerating the sewage sludge in the holding tank prior to the step of dewatering the sewage sludge.

It is yet another aspect of the present invention to provide a process for treating sewage sludge in accordance with any of the aspects of the present invention described herein, further comprising the step of treating the sewage sludge with one or more treating agents selected from a group consisting of an acid, a base, and an oxidant prior to the step of dewatering the sewage sludge.

It is yet another aspect of the present invention to provide a process for treating sewage sludge in accordance with any of the aspects of the present invention described herein, wherein the acid, base, and oxidant are selected from the group consisting of inorganic acids, organic acids, calcium hydroxide, calcium oxide, ferrous chloride, chlorine dioxide, peracetic acid, hydrogen peroxide, ozone, and sodium hypochlorite.

It is yet another aspect of the present invention to provide a process for treating sewage sludge in accordance with any of the aspects of the present invention described herein, further comprising the step of providing a mixing vessel for mixing the thermally treated and dewatered sewage sludge with the portion of the decomposition process product to form a mixture of the thermally treated and dewatered sewage sludge and the portion of the decomposition process product.

It is yet another aspect of the present invention to provide a process for treating sewage sludge in accordance with any of the aspects of the present invention described herein, wherein the mixing vessel has an agitator to effect mixing the thermally treated and dewatered sewage sludge with the portion of the decomposition process product.

It is yet another aspect of the present invention to provide a process for treating sewage sludge in accordance with any of the aspects of the present invention described herein, further comprising the step of cooling the mixture of the thermally treated and dewatered sewage sludge and the portion of the decomposition process product prior to the aerobic biochemical decomposition process, wherein the mixture of the thermally treated and dewatered sewage sludge and the portion of the decomposition process product is cooled to a temperature of about 150° F. or less prior to the aerobic biochemical decomposition process.

It is yet another aspect of the present invention to provide a process for treating sewage sludge in accordance with any of the aspects of the present invention described herein, wherein the mixture of the thermally treated and dewatered sewage sludge and the portion of the decomposition process product has a ratio by weight of the thermally treated and dewatered sewage sludge to the portion of the decomposition process product in the range of from about 1:1 to about 1:3.

It is yet another aspect of the present invention to provide a process for treating sewage sludge in accordance with any of the aspects of the present invention described herein, wherein the mixture of the thermally treated and dewatered sewage sludge and the portion of the decomposition process product has a ratio by weight of the thermally treated and dewatered sewage sludge to the portion of the decomposition process product in the range of about 1:2.

It is yet another aspect of the present invention to provide a process for treating sewage sludge in accordance with any of the aspects of the present invention described herein, further comprising the step of treating the sewage sludge with one or more treating agents selected from a group consisting of an acid, a base, and an oxidant prior to the aerobic biochemical decomposition process.

It is yet another aspect of the present invention to provide a process for treating sewage sludge in accordance with any of the aspects of the present invention described herein, wherein the acid, base, and oxidant are selected from the group consisting of inorganic acids, organic acids, calcium hydroxide, calcium oxide, ferrous chloride, chlorine dioxide, peracetic acid, hydrogen peroxide, ozone, and sodium hypochlorite.

It is yet another aspect of the present invention to provide a process for treating sewage sludge in accordance with any of the aspects of the present invention described herein, wherein the mixture of the thermally treated and dewatered sewage sludge and the portion of the decomposition process product has a dry solids content of about 50 percent.

It is yet another aspect of the present invention to provide a process for treating sewage sludge in accordance with any of the aspects of the present invention described herein, wherein the step of dewatering the sewage sludge is performed using a filter-belt press.

It is yet another aspect of the present invention to provide a process for treating sewage sludge in accordance with any of the aspects of the present invention described herein, wherein the dewatered sewage sludge has a dry solids content of between about 13 percent to about 40 percent.

It is yet another aspect of the present invention to provide a process for treating sewage sludge in accordance with any of the aspects of the present invention described herein, wherein the step of heating the dewatered sewage sludge is performed in a heating vessel.

It is yet another aspect of the present invention to provide a process for treating sewage sludge in accordance with any of the aspects of the present invention described herein, wherein the heating vessel is insulated and has an agitator and the dewatered sewage sludge is agitated during the heating step.

It is yet another aspect of the present invention to provide a process for treating sewage sludge in accordance with any of the aspects of the present invention described herein, wherein the dewatered sewage sludge is heated to a temperature in the range of from about 130° F. to about 212° F. during the heating step.

It is yet another aspect of the present invention to provide a process for treating sewage sludge in accordance with any of the aspects of the present invention described herein, further comprising the step of treating the sewage sludge with one or more treating agents selected from a group consisting of an acid, a base, and an oxidant prior to the aerobic biochemical decomposition process.

It is yet another aspect of the present invention to provide a process for treating sewage sludge in accordance with any of the aspects of the present invention described herein, wherein the acid, base, and oxidant are selected from the group consisting of inorganic acids, organic acids, calcium hydroxide, calcium oxide, ferrous chloride, chlorine dioxide, peracetic acid, hydrogen peroxide, ozone, and sodium hypochlorite.

It is yet another aspect of the present invention to provide a process for treating sewage sludge in accordance with any of the aspects of the present invention described herein, wherein the dewatered sewage sludge is heated for a time period of about 15 seconds to about 30 minutes during the heating step.

It is yet another aspect of the present invention to provide a process for treating sewage sludge in accordance with any of the aspects of the present invention described herein, wherein the aerobic biochemical decomposition process is performed using a rotary drum digester.

It is yet another aspect of the present invention to provide a process for treating sewage sludge in accordance with any of the aspects of the present invention described herein, wherein the aerobic biochemical decomposition process is aerated static pile composting.

It is yet another aspect of the present invention to provide a process for treating sewage sludge in accordance with any of the aspects of the present invention described herein, wherein the aerobic biochemical decomposition process is windrow composting.

It is yet another aspect of the present invention to provide a process for treating sewage sludge in accordance with any of the aspects of the present invention described herein, wherein the decomposition process product is composed of from about 50 percent to about 75 percent dry solids.

It is an aspect of the present invention to provide a process for treating liquid sewage sludge, to produce an end product that is an active bed of aerobic microorganisms in various stages including decay, and having a solids concentration of the end product is greater than 50% dry solids, the process comprising:
(a) providing liquid sewage sludge,
(b) biologically stabilizing the liquid sewage sludge,
(c) dewatering the liquid sewage sludge to at least a 13 percent dry solids content, (d) applying heat to the dewatered liquid sewage sludge to a temperature at least as great as required by EPA 503 Class A Pathogen Reduction to provide preconditioned, dewatered liquid sewage sludge, (e) mixing the preconditioned, dewatered liquid sewage sludge with aerobically digested sewage sludge to provide feed for aerobic digestion, (f) aerobically digesting the feed for aerobic digestion by mixing the feed while aerating the feed with sufficient air to maintain aerobic conditions to control odor to provide aerobically digested sludge and exhaust air, (g) recycling a portion of the aerobically digested sludge for mixing with the preconditioned, dewatered liquid sewage sludge, and (h) curing a portion of the aerobically digested sludge.

It is yet another aspect of the present invention to provide a process for treating liquid sewage sludge in accordance with any of the aspects of the present invention described herein, further comprising mixing odor control chemicals with the biologically stabilized liquid sewage sludge to improve the efficiency of the process and control odors.

It is yet another aspect of the present invention to provide a process for treating liquid sewage sludge in accordance with any of the aspects of the present invention described herein, further comprising mixing odor control chemicals with the dewatered liquid sewage sludge to improve the efficiency of the process and control odors.

It is yet another aspect of the present invention to provide a process for treating liquid sewage sludge in accordance with any of the aspects of the present invention described herein, further comprising recycling exhaust air to aerobically digest the feed for aerobic digestion and curing.

It is yet another aspect of the present invention to provide a process for treating liquid sewage sludge in accordance with any of the aspects of the present invention described herein, further comprising screening the aerobically digested sludge.

It is yet another aspect of the present invention to provide a process for treating liquid sewage sludge in accordance with any of the aspects of the present invention described herein, further comprising mixing the feed in at least two stages.

It is yet another aspect of the present invention to provide a process for treating liquid sewage sludge in accordance with any of the aspects of the present invention described herein, further controlling mixing in each stage independently.

It is yet another aspect of the present invention to provide a process for treating liquid sewage sludge in accordance with any of the aspects of the present invention described herein, the odor control chemicals being selected from the group consisting of ferric chloride, lime, acid base and/or oxidants.

It is yet another aspect of the present invention to provide a process for treating liquid sewage sludge in accordance with any of the aspects of the present invention described herein, the odor control chemicals being selected from the group consisting of ferric chloride, lime, acid base and/or oxidants It is an aspect of the present invention to provide an apparatus for treating liquid sewage sludge, the apparatus comprising:

(a) a holding tank for holding liquid sewage sludge, (b) a dewatering device for receiving liquid sewage sludge and dewatering the liquid sewage sludge to at least a 13 percent dry solids content to provide a dewatered sewage sludge, (c) an aerobic digester for receiving a material including the dewatered sewage sludge and aerobically digesting the dewatered sewage sludge to provide aerobically digested sludge, (d) means for separating a portion of the aerobically digested sludge, (e) a mixer for mixing the separated portion of the aerobically digested sludge with the dewatered sewage sludge to provide a material including the dewatered sewage sludge, (f) means for providing the material including the dewatered sewage sludge to the aerobic digester, and (g) means for providing air to the aerobic digester.

It is yet another aspect of the present invention to provide an apparatus for treating liquid sewage sludge in accordance with any of the aspects of the present invention described herein, further comprising heat from the aerobic digester.

It is yet another aspect of the present invention to provide an apparatus for treating liquid sewage sludge in accordance with any of the aspects of the present invention described herein, wherein the aerobic digester includes at least two stages.

It is yet another aspect of the present invention to provide an apparatus for treating liquid sewage sludge in accordance with any of the aspects of the present invention described herein, wherein the aerobic digester includes single or multiple dual mixing shafts and an auger for conveying the material.

It is yet another aspect of the present invention to provide an apparatus for treating liquid sewage sludge in accordance with any of the aspects of the present invention described herein, wherein the aerobic digester includes a rotatable drum.

It is yet another aspect of the present invention to provide an apparatus for treating liquid sewage sludge in accordance with any of the aspects of the present invention described herein, wherein the rotatable drum includes at least two independently controllable segments.

It is yet another aspect of the present invention to provide an apparatus for treating liquid sewage sludge in accordance with any of the aspects of the present invention described herein, wherein each segment includes a rotatable drum segment.

It is yet another aspect of the present invention to provide an apparatus for treating liquid sewage sludge in accordance with any of the aspects of the present invention described herein, wherein the rotation of each drum segment is controlled by a variable frequency drive.

It is yet another aspect of the present invention to provide an apparatus for treating liquid sewage sludge in accordance with any of the aspects of the present invention described herein, wherein the drum can be rotated in either or both directions.

It is yet another aspect of the present invention to provide an apparatus for treating liquid sewage sludge in accordance with any of the aspects of the present invention described herein, wherein the frequency, duration and speed can be adjusted to improve the efficiency of the process and control odors.

In yet another aspect of the present invention, the present invention provides a process for treating liquid sewage sludge, to produce an end product that is an active bed of aerobic microorganisms in various stages including decay, and having a solids concentration of the end product is greater than 50% dry solids, the process comprising:

(a) providing liquid sewage sludge, (b) biologically stabilizing the liquid sewage sludge, (c) dewatering the liquid sewage sludge to at least a 13 percent dry solids content, (d) applying heat to the dewatered liquid sewage sludge to a temperature at least as great as required by EPA 503 Class A Pathogen Reduction to provide preconditioned, dewatered liquid sewage sludge, (e) providing aerobically digested sewage sludge, (f) mixing the preconditioned, dewatered liquid sewage sludge with the aerobically digested sewage sludge to provide feed for aerobic digestion, (g) aerobically digesting the feed for aerobic digestion by mixing the feed while aerating the feed with sufficient air to maintain aerobic conditions to control odor to provide aerobically digested sludge and exhaust air, (h) recycling a portion of the aerobically digested sludge for mixing with the preconditioned, dewatered liquid sewage sludge in step (f), and (i) curing a portion of the aerobically digested sludge.

These and other aspects and advantages of the present invention will be further elucidated by the following Detailed Description, drawing figures, and Claims.

BRIEF DESCRIPTION OF THE DRAWING FIGURES

DETAILED DESCRIPTION

The present invention involves a process for treating sewage sludge, and corresponding apparatus, designed to effect a high rate of biochemical decomposition that produces a stabilized organic product by consuming at least 38% of the volatile solids of the untreated sewage or the dewatered sludge cake. Dewatered sewage sludge cake (having from about 13% or more dry solids) is subjected to digestion in an active aerobic microbial bed and heat or thermal treatment to kill pathogens and achieve the desired reduction in volatile solids. A portion of the stabilized organic product, also known as treated biosolids, is reintroduced with the heated, dewatered sludge cake into the active aerobic microbial bed. The continuous process produces an end product that improves the ability of soil to sequester carbon by stimulating growth of indigenous plants. This is facilitated by providing micro and macro nutrients in a bioavailable form while simultaneously changing the nature of the soil to increase the ability of the soil to retain moisture. Thus the process of the present invention provides a more balanced food source and more water for improved metabolism in the root system of plant life and thereby increases sequestration of carbon within the community of flora growing in soil fortified with the treated biosolids product produced by the present invention.

Figure 1A:
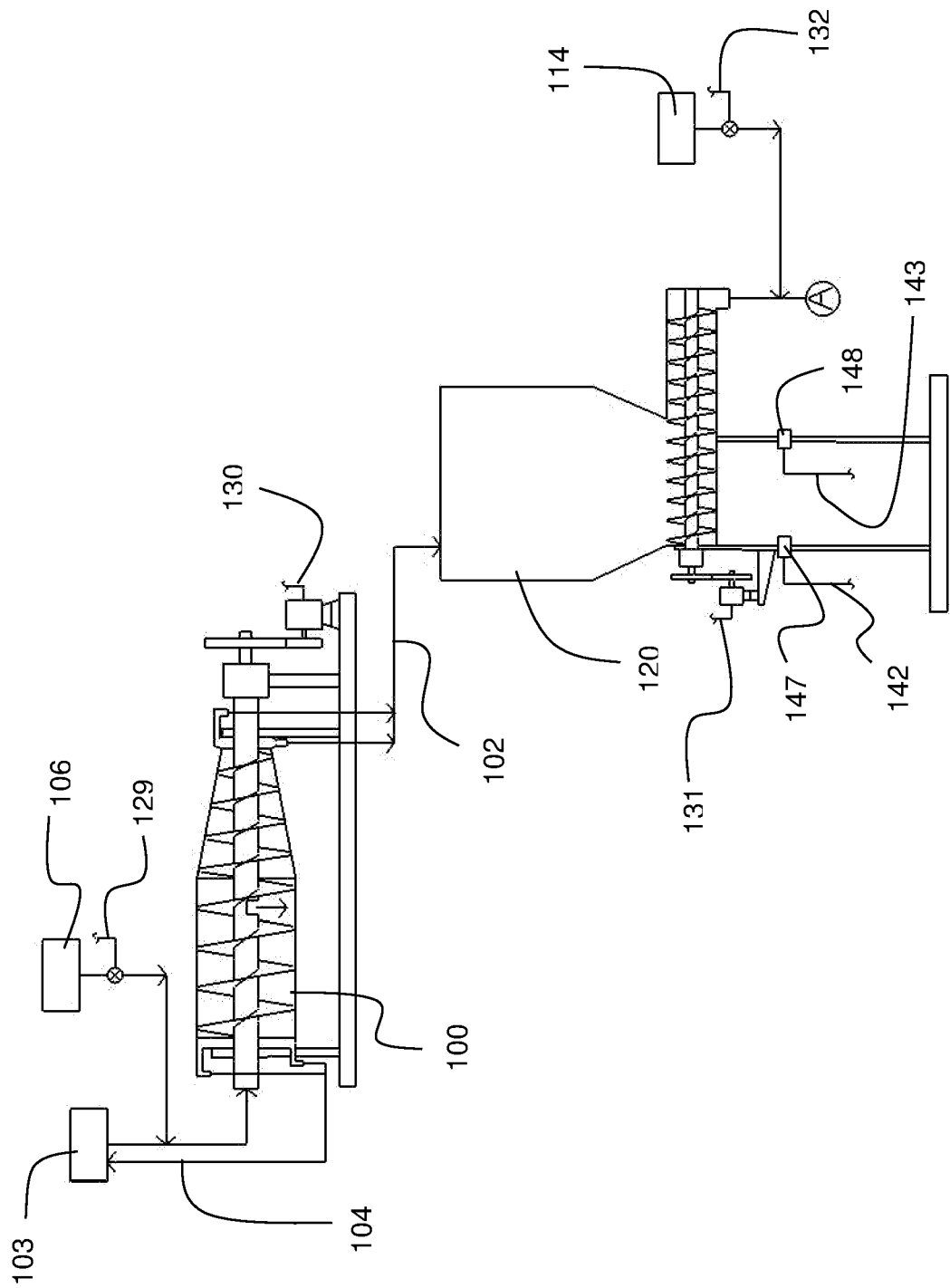
FIGS. 1A and 1B show an overall schematic view of an apparatus and process for treating sewage sludge in accordance with the present invention.

The process of the present invention includes the following steps:

a) Raw liquid sewage sludge, which normally contains one to six percent by weight dry solids, is dewatered to produce sewage sludge cake that contains about thirteen percent by weight or more dry solids. The dewatering can be accomplished using any known dewatering process. The supernatant from the dewatering process, if any, is preferably recycled back to the waste water treatment facility for treatment along with the other waste water entering the facility. Examples of suitable dewatering processes include, without limitation, air drying using sand or paved beds or lagoons, and mechanical dewatering using plate and frame filter press, filter-belt press, and decanter or solid bowl centrifuge. Mechanical dryers may also be used to reduce the water content of the sludge. An example of a suitable dryer is shown in U.S. Pat. No. 7,669,348 B2, issued on Mar. 2, 2010, to Christy et al., which is incorporated herein by reference in its entirety. Other dryer types such as belt dryers and heated agitator dryers may be used as long as they are configured to be controlled such that excessive moisture removal is avoided.

b) The dewatered sewage sludge cake is then thermally conditioned, in other words pasteurized, in a pasteurization process. The pasteurization preferably takes place in an electrically heated, stainless steel vessel. Alternatively, the vessel may be heated by a heat transfer medium such as steam or oil conducted through a jacket, heating coils or tubes, or a hollow agitator. In the illustrated exemplary process of FIG. 1, the pasteurization vessel 108 is a stainless steel vessel having an electrically heated agitator. To meet regulatory requirements, the entire mass of the sewage sludge cake or biochemical decomposition product must be maintained at a temperature of 70° C. or higher for at least 30 minutes.

c) The heated and dewatered sewage sludge is then introduced into an aerobic microbial bed to effect a high rate of biochemical decomposition that produces a biochemical decomposition product with at least 38% volatile solids reduction. The heated and dewatered sewage sludge fed to the microbial bed is seeded with active microbes that have already been through the decomposition process and are recycled back into the aerobic bed. Sufficient and variable amounts of air, mixing and volume are required to maintain the active microbial bed. Also, the aerobic biochemical decomposition process and the pasteurization process in the same vessel to reduce capital costs. Additionally, the dewatered sewage sludge may also be chemically conditioned prior to and/or during the dewatering step and/or the thermal treatment step to control odor if necessary.

The result of the process of the present invention will be a treated biosolids product or a heated and biochemically decomposed product that can be subjected to conventional finishing, cooling, aging, and/or curing processes to become a treated biosolids product. For example, the product of the biochemical decomposition step is allowed to cool and/or cure under aerobic conditions until the amount of the volatile solids in the treated biosolids product has been reduced by at least 38% compared to the amount of the volatile solids in the sewage sludge. Some reduction in volatile solids continues to occur during the cooling process due to continuing microbial activity. Therefore, the residence time of the dewatered and heated sewage sludge cake in the active microbial bed may be selected by the process or facility operator such the product of the aerobic biochemical decomposition process has a volatile solids content that is 38% reduced relative to the sewage sludge cake, or the 38% reduction in volatile solids may be achieved with the further steps of cooling or curing of the biochemical decomposition product. In the former instance, the product of the aerobic decomposition process will meet the vector attraction reduction (VAR) requirements after the aerobic biochemical decomposition step and therefore can be considered a treated biosolids product suitable for land application. In the latter instance, the product of the heating and aerobic decomposition steps will not meet the VAR requirements until after the cooling and/or curing step, which then yields the treated biosolids product suitable for land application. Percentages provided herein are by weight unless otherwise specified.

The terms "treated biosolids" or "treated biosolids product" as used herein refers to a product that is suitable beneficial use including land application. At a minimum the treated biosolids meet the regulatory requirements for "class B" biosolids. More preferably, the parameters of the process of the present invention are selected such that the product of the heating and biochemical decomposition steps is a "class A" product. Class A and class B classification requirements are defined by government regulations. The difference between class A and class B products lies in the level of pathogens in the products. The pathogens in class A products are reduced to such a level that they can be land applied as fertilizer without restriction. The pathogens in class B products are significantly reduced compared to untreated sewage sludge, but their use is subject to restrictions on the type of use and on accessibility to people and livestock.

Referring to FIGS. 1A, 1B, 2, and 3, raw sewage sludge, coming from a waste water treatment facility, is directed into a dewatering apparatus 100. Depending upon the dewatering apparatus used, there may be a water-containing supernatant stream from the dewatering process that can be recycled back to the waste water treatment facility (not shown). In the illustrative example, the dewatering apparatus 100 is a decanter centrifuge, also known as a solid bowl centrifuge that produces a dewatered sewage sludge (a.k.a. sewage sludge cake) and a supernatant stream that is largely water. The supernatant stream is usually contaminated with pathogens and should therefore be handled in accordance with environmental regulations. It is preferred for the supernatant stream 104 to be returned to the waste water treatment facility 103 for treatment in accordance with regulations.

The dewatered sewage sludge 102 that is produced by the dewatering apparatus 100 is composed of about 13 percent or more by weight dry solids. Typically, the dewatered sewage sludge 102 that is produced by the dewatering apparatus 100 is composed of from about 13 to about 40 percent by weight dry solids. More preferably, the dewatered sewage sludge 102 that is produced by the dewatering apparatus 100 is composed of from about 13 to about 35 percent by weight dry solids. Even more preferably, the dewatered sewage sludge 102 that is produced by the dewatering apparatus 100 is composed of from about 13 to about 30 percent by weight dry solids. In the illustrative embodiment, the dewatered sewage sludge 102 that is produced by the dewatering apparatus 100 is composed of about 13 percent by weight dry solids.

As part of the dewatering process, a flocculant from flocculant tank 106 may be added to the sewage sludge to help in separating the solids from the water in the sewage sludge. The flocculant may be inorganic, such as lime, ferric chloride, and other metallic salts, or an organic polymer that is biodegradable, such as anionic or cationic copolymers of acrylamide. Whatever flocculant is used, it must not harm the micro-organisms that will biochemically decompose the volatile solids in the dewatered sewage sludge in the subsequent aerobic biochemical decomposition step.

As another option, lime may added to the dewatered sewage sludge to keep down odors during the aerobic biochemical decomposition step, but the added lime must not raise the pH of the dewatered sewage sludge to such a level that the micro-organisms that are to biochemically decompose the volatile solids in the dewatered sewage sludge will be destroyed or deactivated. Odor control can also be achieved by using an enclosed vessel for the aerobic biochemical decomposition step. This arrangement allows the use scrubbers and/or filters 153, such as activated charcoal filters, to remove odoriferous substances from the exhaust from the enclosed vessel, which would obviate the need to use lime for odor control.

The dewatered sewage sludge is then thermally treated, in other words heated or heat pasteurized, to kill pathogens including, for example, pathogenic bacteria, viruses, and helminth ova. The heating step 118 yields a heated or thermally treated dewatered sewage sludge wherein the concentration of pathogens is reduced to the degree required by government regulation in accordance with the intended end use of the treated biosolids. Preferably, the operating conditions in the heating step are selected to reduce the concentration of pathogens to levels below detectable levels to meet so called "Class A" requirements of the applicable regulations of the United States government's Environmental Protection Agency (EPA). To accomplish this goal, the dewatered sewage sludge is kept at a temperature of at least 70° C. for at least 30 minutes throughout its entire mass during the heating step. More preferably, the step of pasteurizing the dewatered sewage sludge is accomplished by maintaining the dewatered sewage sludge at a temperature in the range of from at least 70° C. to at most 100° C. for at least 30 minutes. In the illustrative embodiment, the heating or pasteurization step 118 is carried out in a stainless vessel 108 that is electrically heated by being provided with an electrically heated agitator. Preferably, the vessel 108 is used for both the biochemical decomposition step and for the heating step to reduce capital costs. The step of heating the dewatered sewage sludge is carried out by initiating the supply of energy to heat up the agitator before the step of biochemical decomposition has been carried out. The vessel 108 is provided with temperature sensors 128 that allow a computerized or electronic controller 112, which is part of a computerized or electronic control system, to control the energy supplied to the agitator for heating the agitator in order to achieve and maintain the required temperature for the required duration in the process material or contents within the vessel 108. Preferably, the step of pasteurizing the dewatered sewage sludge is performed at atmospheric pressure. The dewatered sludge 102 is feed to the digestion/pasteurization vessel 108 via a volumetric and/or gravimetric feeder 120 that ensures that the correct amount of dewatered sludge, suitable for the capacity of the vessel 108, is fed to the vessel 108.

After the heating or thermal step, the heated and dewatered sewage sludge is then subjected to an aerobic biochemical decomposition process or step 116 to produce a decomposition process product that has a substantially reduced volatile solids content. So called "volatile solids" are carbohydrate, proteinaceous, and fatty substances in the sewage sludge that could serve as food for pathogens or for vectors, such as rodents, insects, or birds, or their prey, which can provide a pathway for bringing the pathogens in the sewage sludge into contact with humans or domestic animals. The object of vector attraction reduction or VAR is to reduce the available amount of this food source through, for example, microbial digestion or decomposition of this food source into nitrates, carbon dioxide, and water. Current United States law requires at least a 38% reduction in the volatile solids in the sewage sludge before the treated biosolids product or the aerobic decomposition process product can be applied to the land as fertilizer. In the illustrative embodiment, the biochemical decomposition process or step 116 is carried out in a stainless steel vessel 108.

Figure 4:
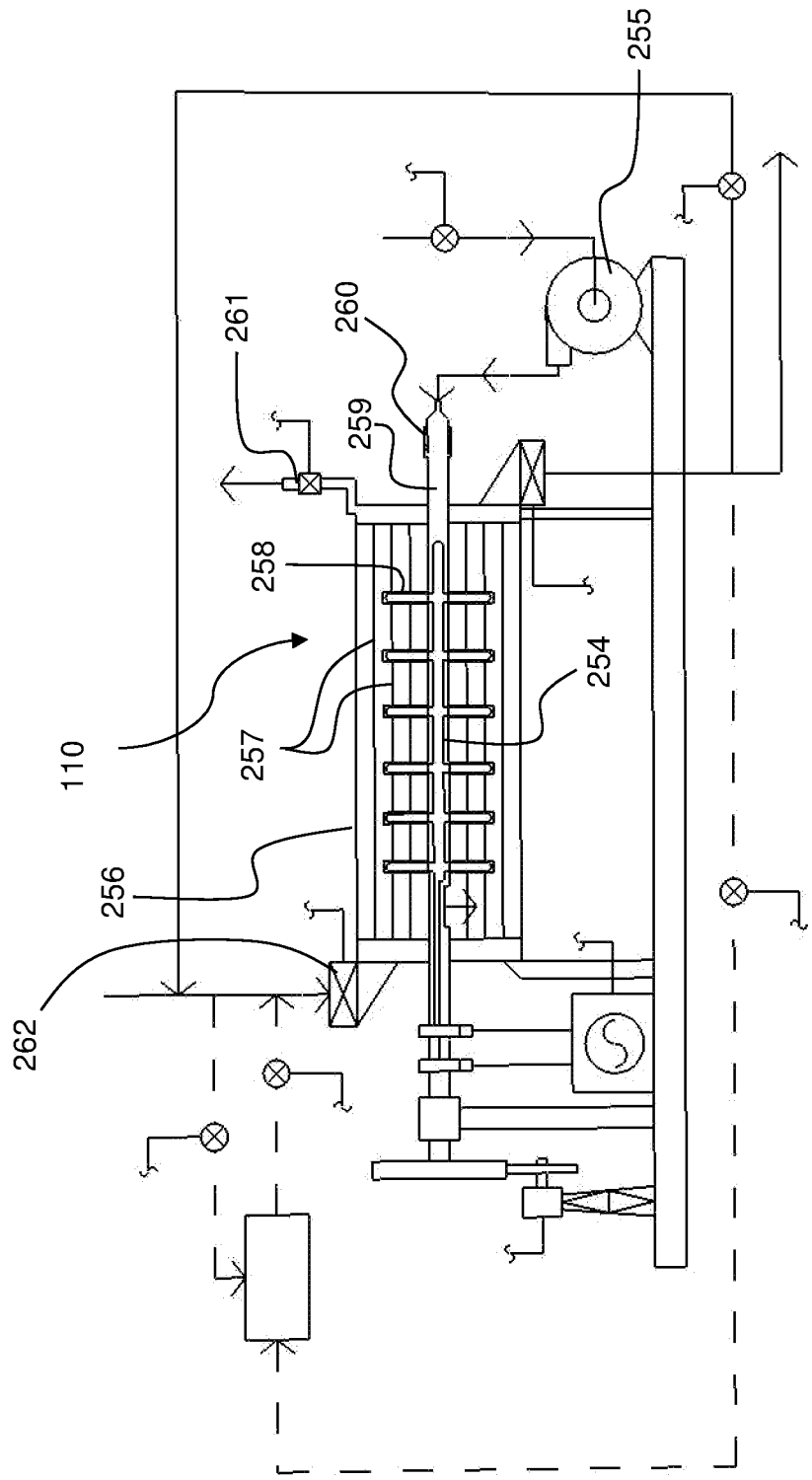
FIG. 4 is a diagrammatic depiction of an alternative type of biochemical decomposition and heating vessel of a rotating drum type that has an electrically heated agitator as well as internal vanes that radially project from the inner surface of the drum for use in the process for treating sewage sludge in accordance with the present invention.

As has been stated, after the dewatered sewage sludge is heated or thermally treated, the dewatered sewage sludge is subjected to a biochemical decomposition process or step to reduce the amount of volatile solids in the material being processed. In the process of the present invention, aerobic biochemical decomposition in an active aerobic microbial bed is the preferred method for vector attraction reduction. Several aerobic biochemical decomposition processes are contemplated as being suitable for use in the present invention. The suitable aerobic biochemical decomposition processes include, for example, aerobic digestion or an in-vessel composting process with an agitated bed. Preferably, a high efficiency aerobic digestion process is employed in the present invention as the aerobic biochemical decomposition process. In the illustrative embodiment of FIGS. 1A and 1B, aerobic digestion in the vessel 108 is used as the aerobic biochemical decomposition process. FIG. 4 illustrates a rotary drum digester 110 that can be used as an alternative to the 108 for the aerobic biochemical decomposition process employed in the present invention. The drum 110 can also be used for the heating step. The thermally treated and dewatered sludge may be fed to the vessel 108 via an optional mixing apparatus or step 122. The durations and the temperatures to be maintained during the digestion step or process, are programmed into the computerized controller 112. The computerized controller 112 controls the operation of various valves, gates, conveyors, heaters, agitators, motors and blowers as necessary to achieve the required level of reduction of the volatile solids and the required level of pathogen reduction in the material being processed. The agitator in vessel 108, and in turn the contents of the vessel 108, may be heated during the biochemical decomposition step if necessary to achieve or maintain optimum temperatures needed for microbial activity during, or at least at the beginning of, the biochemical decomposition step. Process conditions for achieving the required pathogen reduction and vector attraction reduction goals as well as testing protocols to determine that the required pathogen reduction and vector attraction reduction goals have been met, are established by EPA regulations (see 40 C.F.R. § 503). These regulations are summarized in the EPA publication Control of Pathogens and Vector Attraction in Sewage Sludge, EPA/625/R-92/013, revised July 2003.

The thermally treated and dewatered sewage sludge is initially seeded with vegetative microorganisms needed for the aerobic biochemical decomposition process. These microorganisms are well known and readily available. After the first batch of decomposition process product is produced, the thermally treated and dewatered sewage sludge is mixed with at least a portion of the decomposition process product from a previous batch before being subjected to the aerobic biochemical decomposition process. The thermally treated and dewatered sewage sludge is preferably mixed with the recycled decomposition process product in a weight ratio of about one part thermally treated and dewatered sewage sludge to about two parts decomposition process product. However, the thermally treated and dewatered sewage sludge may be mixed with the recycled decomposition process product in a weight ratio for thermally treated and dewatered sewage sludge to decomposition process product ranging from about 1:1 to about 1:3. When composting is used as the aerobic biochemical decomposition process, the process of the present invention allows the composting process to be carried out without using a bulking agent. The heated, dewatered sewage sludge may be mixed with the recycled portion of the decomposition process product, which is the portion recycled to the vessel 108, in the mixing and/or cooling apparatus/step 122.

In some embodiments, anaerobic or a combination of aerobic and anaerobic digestion may be employed as the biochemical decomposition process or step. The air supply to the vessel 108 can be controlled, for example by reducing or shutting off the air supply, as desired to switch from aerobic to anaerobic or combination aerobic/anaerobic digestion. Anaerobic digestion has the benefit of producing methane gas, which can be used as a fuel. However, the additional equipment for handling, storage, and transportation of the methane gas may add to the capital cost, which may make anaerobic digestion undesirable for some installations.

In the embodiment of FIGS. 1A, 1B, 2, and 3, the step of heating the dewatered sewage sludge takes place before the step of subjecting the thermally treated, dewatered sewage sludge to an aerobic biochemical decomposition process that will reduce the level of volatile solids to the desired or predetermined level.

The process of the present invention may optionally include a step of subjecting the dewatered sewage sludge and/or the thermally treated, dewatered sewage sludge to one or more chemical treatments to further sanitize the material being processed prior to the biochemical decomposition process or step. These chemical treatments employ acids, alkaline material, and/or oxidizing agents. In the illustrative example, the chemical treatment includes introducing one or more chemical treating agents, each of the chemical treating agents comprising at least one chemical selected from the group consisting of $ClO_2$ (chlorine dioxide), peracetic acid, hydrogen peroxide, ozone, and sodium hypochlorite, into the dewatered sewage sludge and/or the thermally treated, dewatered sewage sludge. The chemical treatment or sanitization can be done before, after, or concurrent with the dewatering step and/or the pasteurization step. In the illustrated example of FIGS. 1A-3, the optional chemical treatment or sanitization is done concurrently with the pasteurization step as designated by reference numeral 114. The control system 112 can be programmed to supply the chemical treatment agent to the vessel before the biochemical decomposition step and before the heating of the agitator or the heating of the contents of the vessel 108 is initiated. Alternatively, the chemical treatment agent can be added to the vessel 108 during the heating step or after the heating step has been completed. The chemicals listed above are highly reactive, and they react with the molecular compounds making up the pathogens, and thus destroy the pathogens and other organic and/or biological matter in the dewatered sewage sludge and/or the thermally treated, dewatered sewage sludge. Depending upon how rapidly and completely the chemical treatment agent is dissipated or consumed in various reactions and upon the impact of the chemical treating agent on the microorganisms responsible for effecting the biochemical decomposition step, a neutralizing agent may have to be used to neutralize the chemical treatment agent before the biochemical decomposition step can be initiated. Also, the seed microorganisms and/or the recycled decomposition process product for the biochemical decomposition step may have to be added to the vessel 108 after the heating step has been completed, after the thermally treated, dewatered sewage sludge in the vessel 108 has had some time to cool to the required temperature, and, if necessary, after the chemical treating agent has dissipated or been neutralized. In such a case, the vessel 108 also acts as the cooling and/or mixing vessel.

As alternatives and/or in addition to the chemical agents listed above, quick lime (CaO) and/or slaked lime (Ca(OH)$_2$) may be used in some embodiments of the present invention to help in killing pathogens by raising the pH to 10 or higher. Raising the pH to 10 or higher can also help with odor control at any point before the biochemical decomposition step by temporarily suspending microbial activity in the process material. Accordingly, using the quick lime and/or slaked lime may be advisable if odors are found to be a problem at any point before the biochemical decomposition step. However, it is preferable to avoid the use of quick lime or slaked lime because of the material handling complexities and difficulties associated with their use.

The biochemical decomposition step may be followed by steps of curing and/or storage 124 and of producing a product 126, e.g. packaging, shipping, and or applying the product to the land. The computerized controller 112 controls the operation of various valves, gates, conveyors, heaters, agitators, motors and blowers via the control lines 129, 130, 131, 132, 133, 134, 135, 136, 137, 138, 130, 140, 141, 151, and 152. The computerized controller 112 communicates with the various sensors, including temperature sensors 128 and optional load cells 147, 148, 149, and 150 for sensing weight, via the electrical communication lines 142, 143, 144, 145, and 146. The optional load cells 147, 148, 149, and 150 may be used for directly sensing and controlling the amount by weight of materials that are being charged to the various vessels including vessels 108 and 120.

The vessel 108 is used to perform both the step 116 of biochemically decomposing the material to be treated and the step 118 of heating the material being treated to reduce pathogens to required levels. The vessel 108 incorporates heating means 154, aerating means 155, and agitating means 156 so as to be capable of performing both the step of biochemically decomposing the material to be treated and heating the material being treated to reduce pathogens to required levels. The aerating means includes a blower 155 or a suction pump may be used downstream of the scrubber/filter 153. The aerating means efficiently supplies the oxygen for the aerobic bacteria to decompose the volatile solids in the material being treated. The agitating means includes rotating paddles 157 that are connected to the center shaft 159 by semi-circular plates. The heating means includes one or more electrical heating elements 154 that electrically heat the agitator 156 in order to heat the contents of the vessel 108. The center shaft 159 is hollow and is used to circulate air to the contents of the vessel 108. The center shaft 159 is connected to the blower 155 by a fluid-tight rotatable coupling 160. The vessel exhaust 161 is connected to the filter 153. The inlet 162 of the vessel 108 is connected to the feeder 120 to receive material to be treated from the feeder.

Figure 1B:
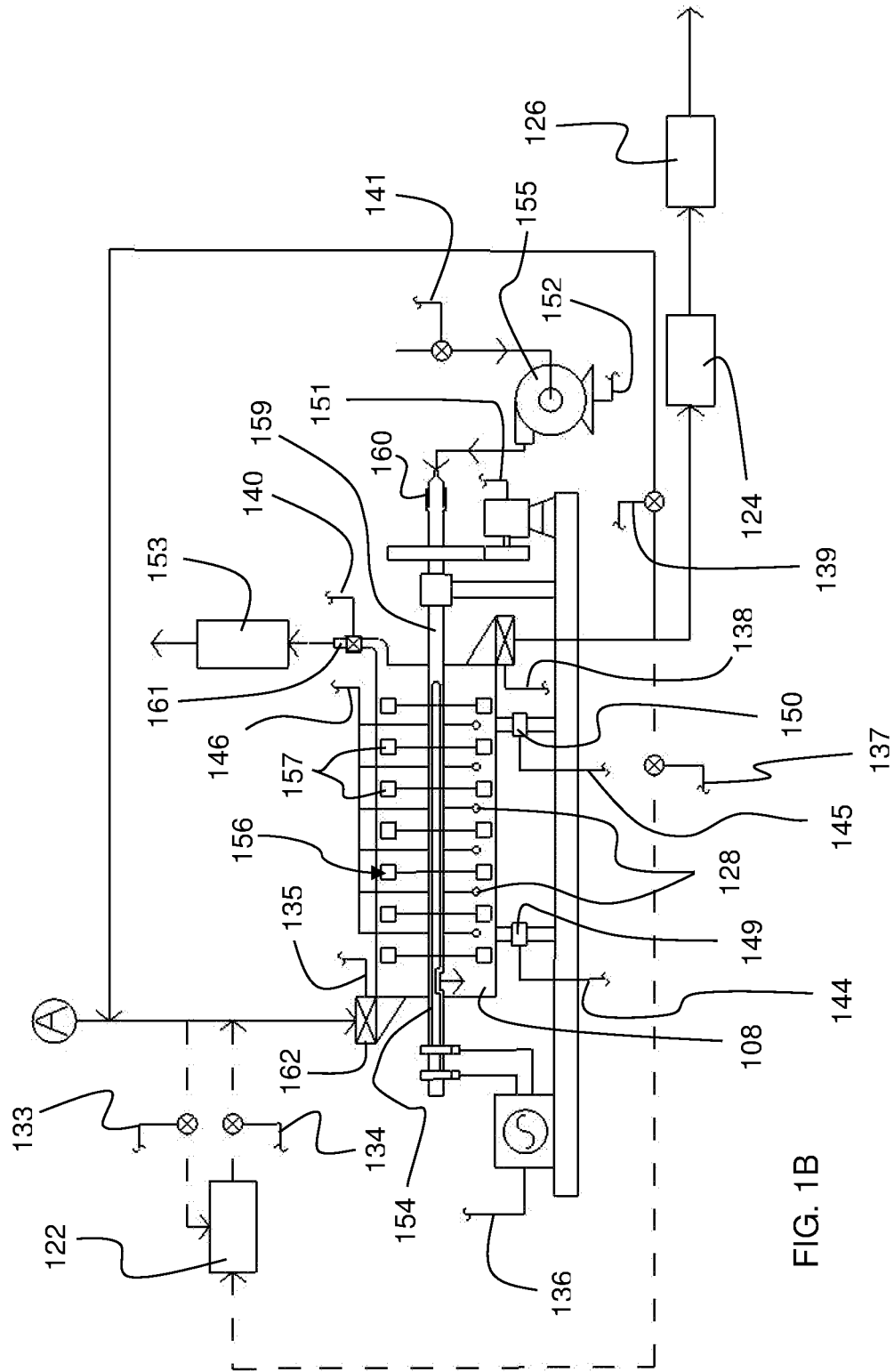
Figure 2:
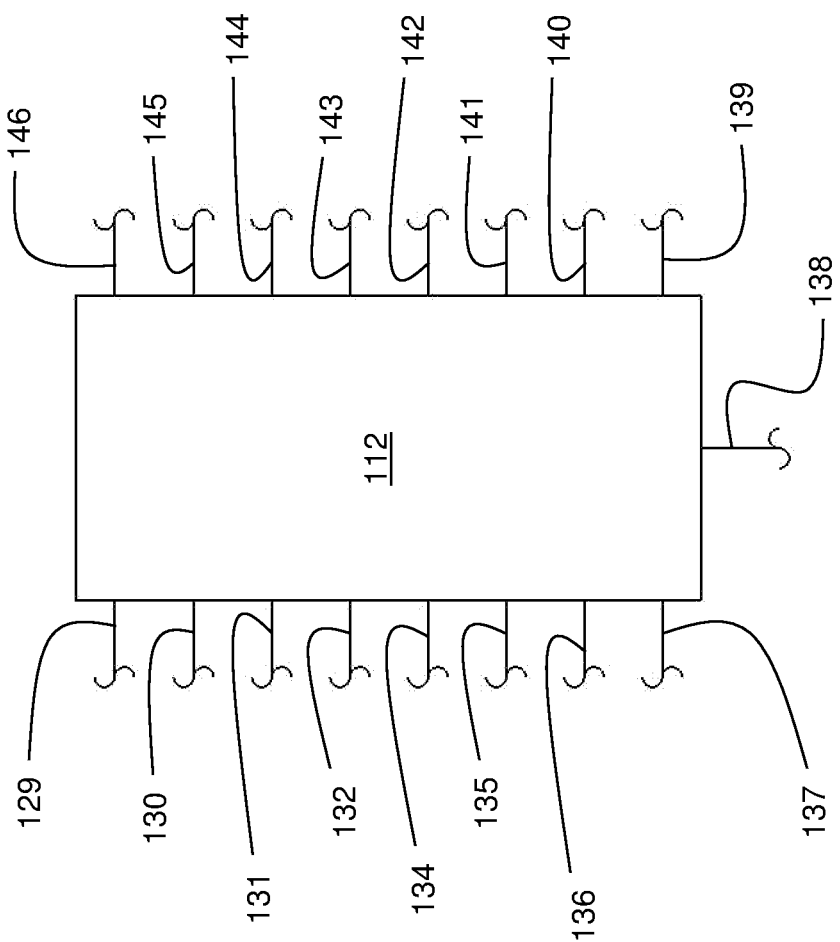
FIG. 2 is a diagrammatic depiction of a computerized, programmable control system for use with in a process for treating sewage sludge in accordance with the present invention.
Figure 3:
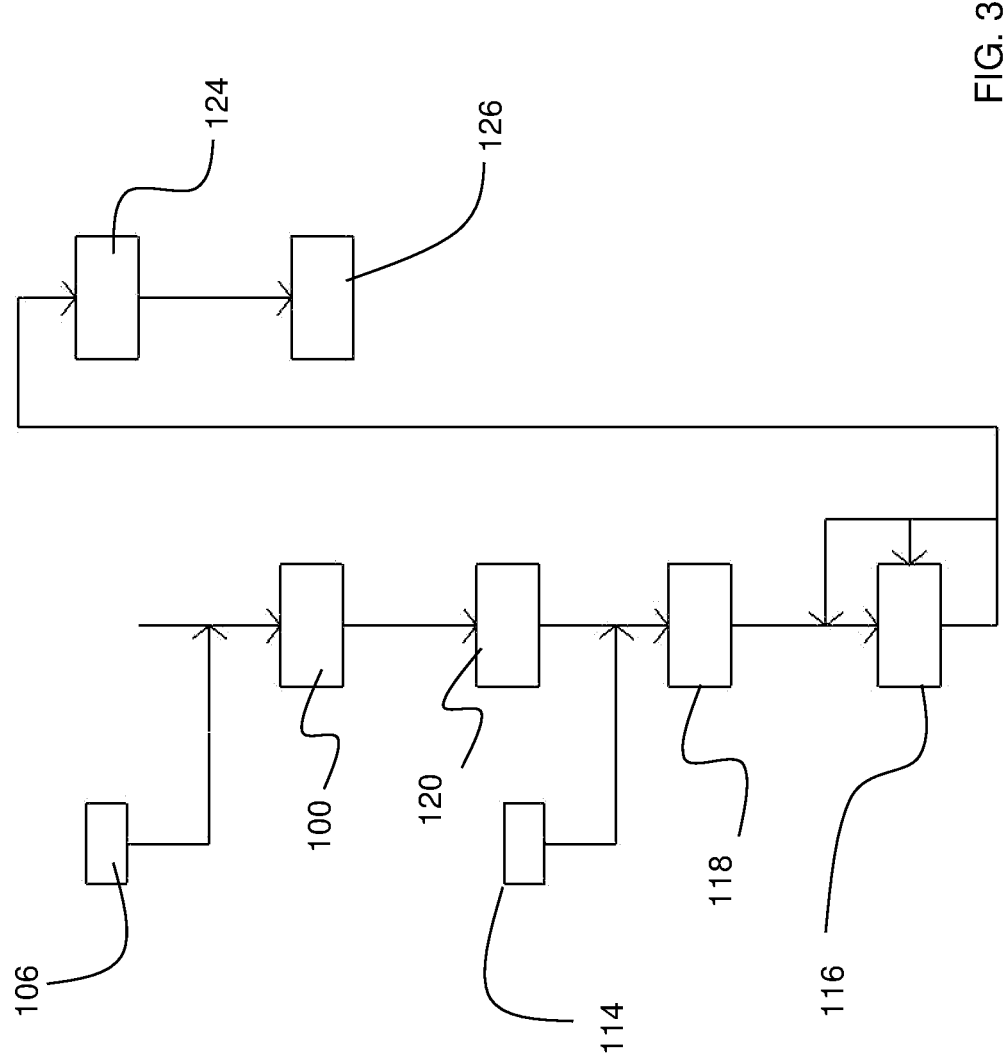
FIG. 3 is a flow diagram of a process for treating sewage sludge in accordance with the present invention.

Referring to FIG. 4, a vessel 110 that can be used to perform both the step of biochemically decomposing the material to be treated and heating the material being treated to reduce pathogens to required levels can be seen, wherein the agitating means includes a rotating drum 256 with internal radial vanes 257. The vessel 110 also has a paddle agitator 258 that rotates with the drum. The heating means includes one or more electrical heating elements 254 that electrically heat the paddle agitator 258 in order to heat the contents of the vessel 110. The center shaft 259 is hollow and is used to circulate air to the contents of the vessel 110. The center shaft 259 is connected to the blower 255 by a fluid-tight rotatable coupling 260. The vessel exhaust 261 would be connected to a filter 153 as shown in FIG. 1B. The inlet 262 of the vessel 110 can be connected to the feeder 120 to receive material to be treated from the feeder.

Figure 5:
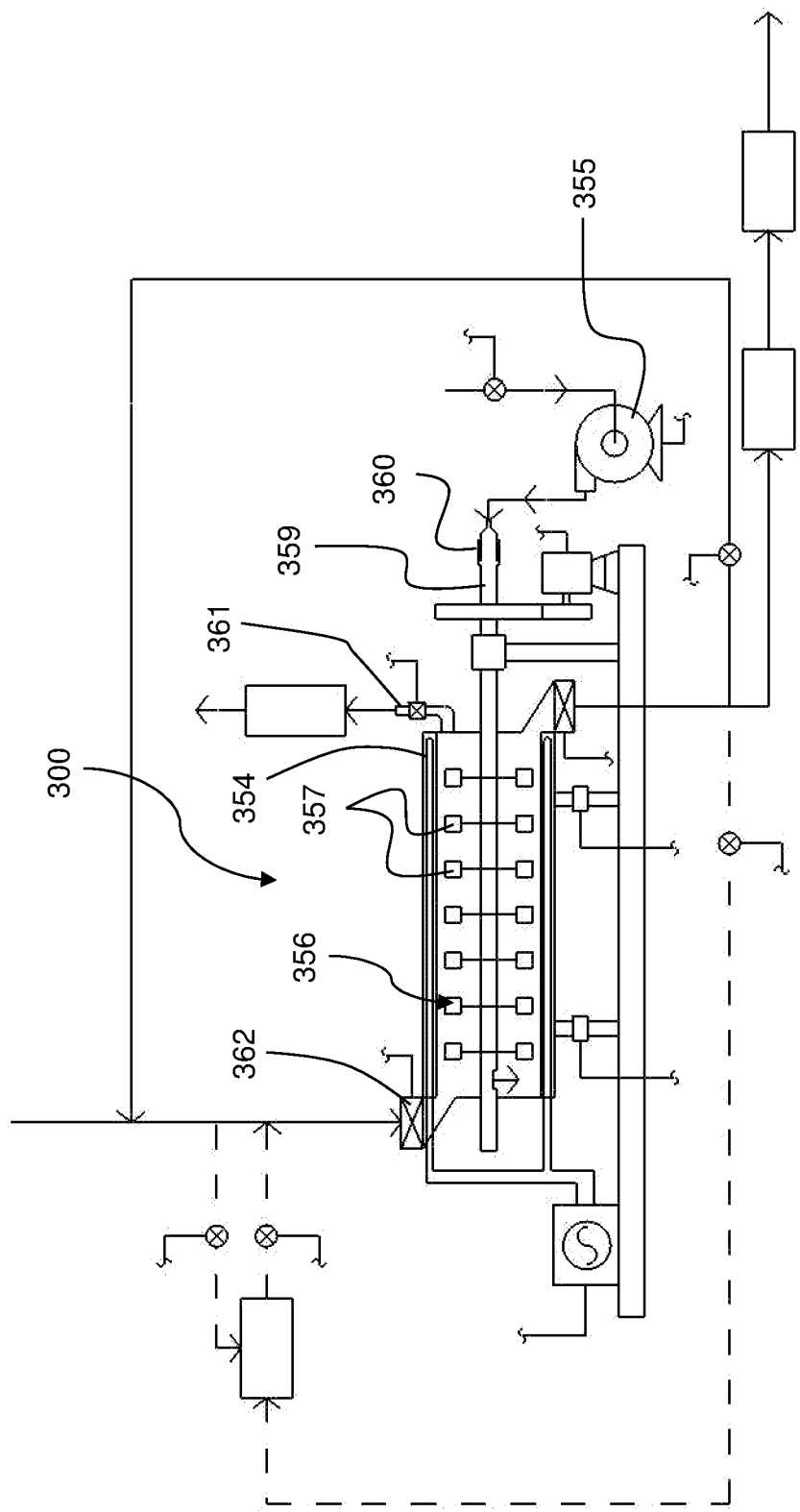
FIG. 5 is a diagrammatic depiction of an alternative type of biochemical decomposition and heating vessel that has electrical heating elements embedded in or attached to the wall of the vessel that allow the vessel to be electrically heated through the vessel wall for use in the process for treating sewage sludge in accordance with the present invention.

Referring to FIG. 5, a vessel 300 that can be used to perform both the step of biochemically decomposing the material to be treated and heating the material being treated to reduce pathogens to required levels can be seen, wherein the agitating means 356 includes rotating paddles 357 that are connected to the center shaft 359 by semi-circular plates. The heating means includes one or more electrical heating elements 354 that are attached or embedded in the vessel wall and electrically heat the vessel wall in order to heat the contents of the vessel 300. The center shaft 359 is hollow and is used to circulate air to the contents of the vessel 300. The center shaft 359 is connected to the blower 355 by a fluid-tight rotatable coupling 360. The vessel exhaust 361 would be connected to a filter 153 as shown in FIG. 1B. The inlet 362 of the vessel 300 can be connected to the feeder 120 to receive material to be treated from the feeder.

Figure 6:
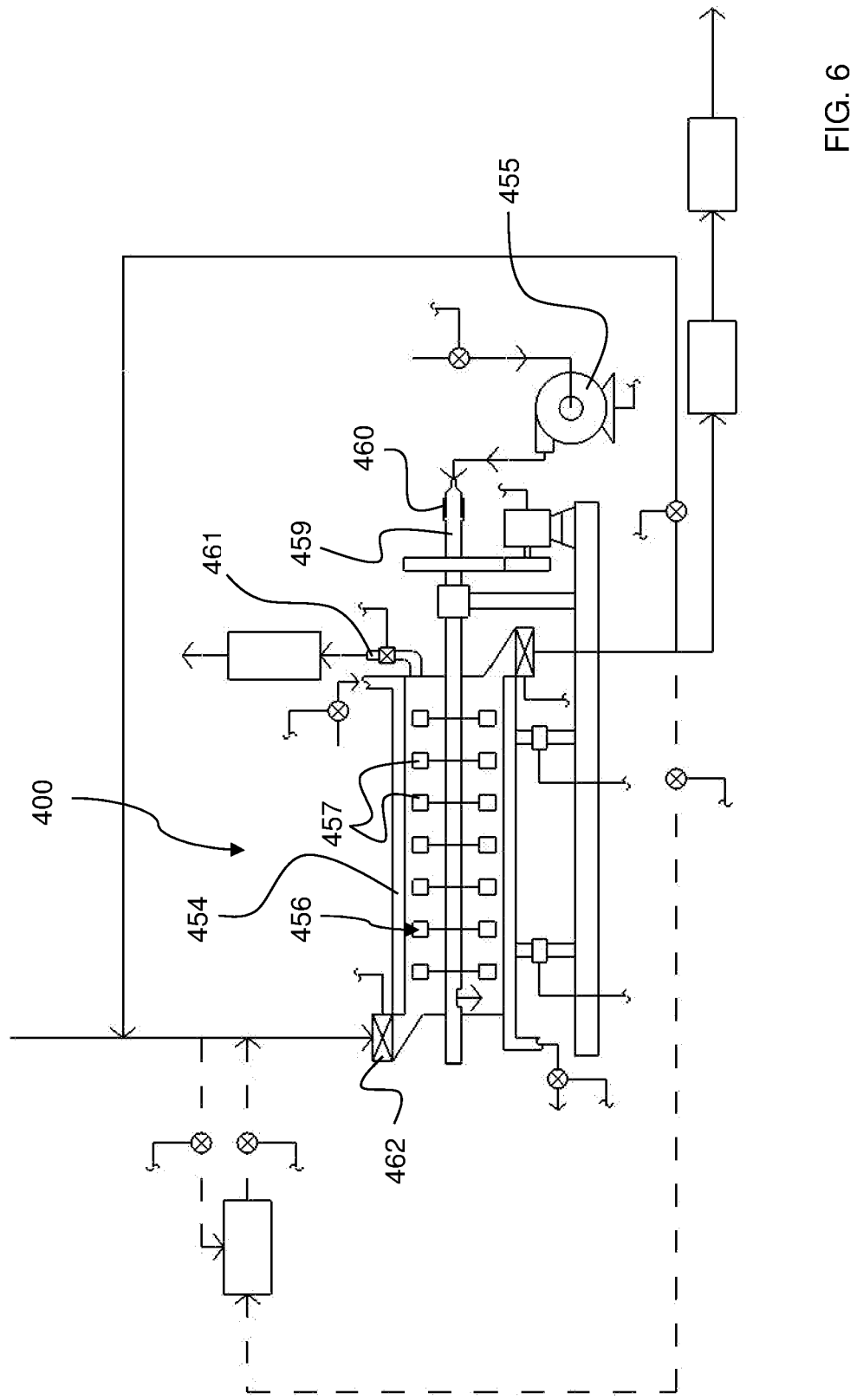
FIG. 6 is a diagrammatic depiction of an alternative type of biochemical decomposition and heating vessel that has a hollow heating jacket that allows the vessel to be heated using a heat transfer medium for use in the process for treating sewage sludge in accordance with the present invention.

Referring to FIG. 6, a vessel 400 that can be used to perform both the step of biochemically decomposing the material being treated and heating the material being treated to reduce pathogens to required levels can be seen, wherein the agitating means 456 includes rotating paddles 457 that are connected to the center shaft 459 by semi-circular plates. The heating means includes a jacket 454 through which a heat transfer medium, such as hot oil, hot water, or steam, is circulated to heat the vessel wall in order to heat the contents of the vessel 400. The center shaft 459 is hollow and is used to circulate air to the contents of the vessel 400. The center shaft 459 is connected to the blower 455 by a fluid-tight rotatable coupling 460. The vessel exhaust 461 would be connected to a filter 153 as shown in FIG. 1B. The inlet 462 of the vessel 400 can be connected to the feeder 120 to receive material to be treated from the feeder.

Figure 7:
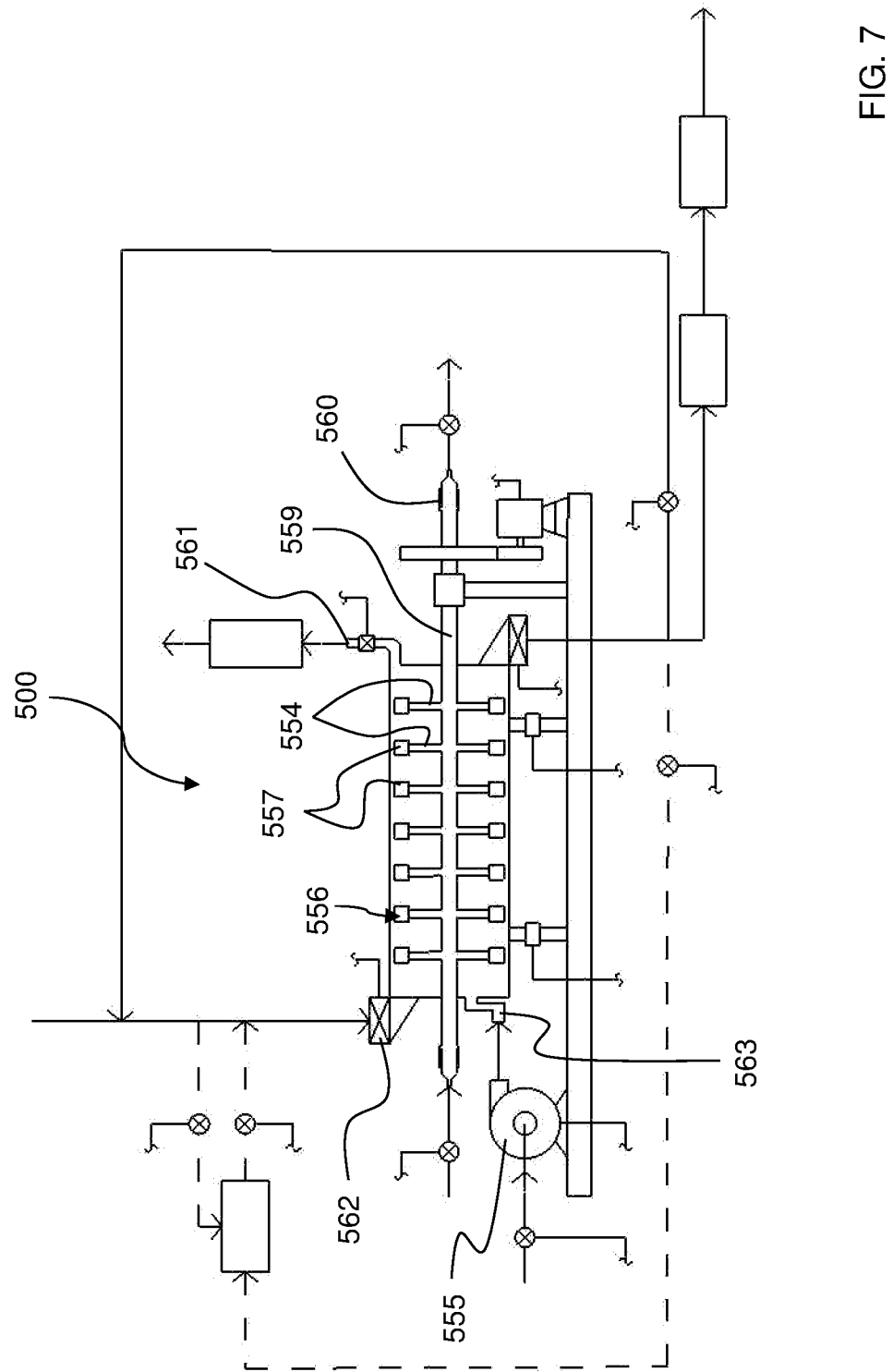
FIG. 7 is a diagrammatic depiction of an alternative type of biochemical decomposition and heating vessel that has a hollow agitator that is heated using a heat transfer medium for use in the process for treating sewage sludge in accordance with the present invention.

Referring to FIG. 7, a vessel 500 that can be used to perform both the step of biochemically decomposing the material being treated and heating the material being treated to reduce pathogens to required levels can be seen, wherein the agitating means 556 includes rotating paddles 557 that are connected to the hollow center shaft 559 by hollow semi-circular plates 554. The heating means employs a heat transfer medium, such as hot oil, hot water, or steam, which is circulated through the hollow agitating means, i.e. the hollow shaft 559 and hollow plates 554, in order to heat the contents of the vessel 500. The center shaft 559 is hollow and is connected to the supply of heat transfer medium (not shown) by a fluid-tight rotatable coupling 560. The blower 555 supplies air to the side of the vessel 500 farthest from the exhaust 561 through an air inlet 563. The vessel exhaust 561 would be connected to a filter 153 as shown in FIG. 1B. The inlet 562 of the vessel 500 can be connected to the feeder 120 to receive material to be treated from the feeder.

Figure 8:
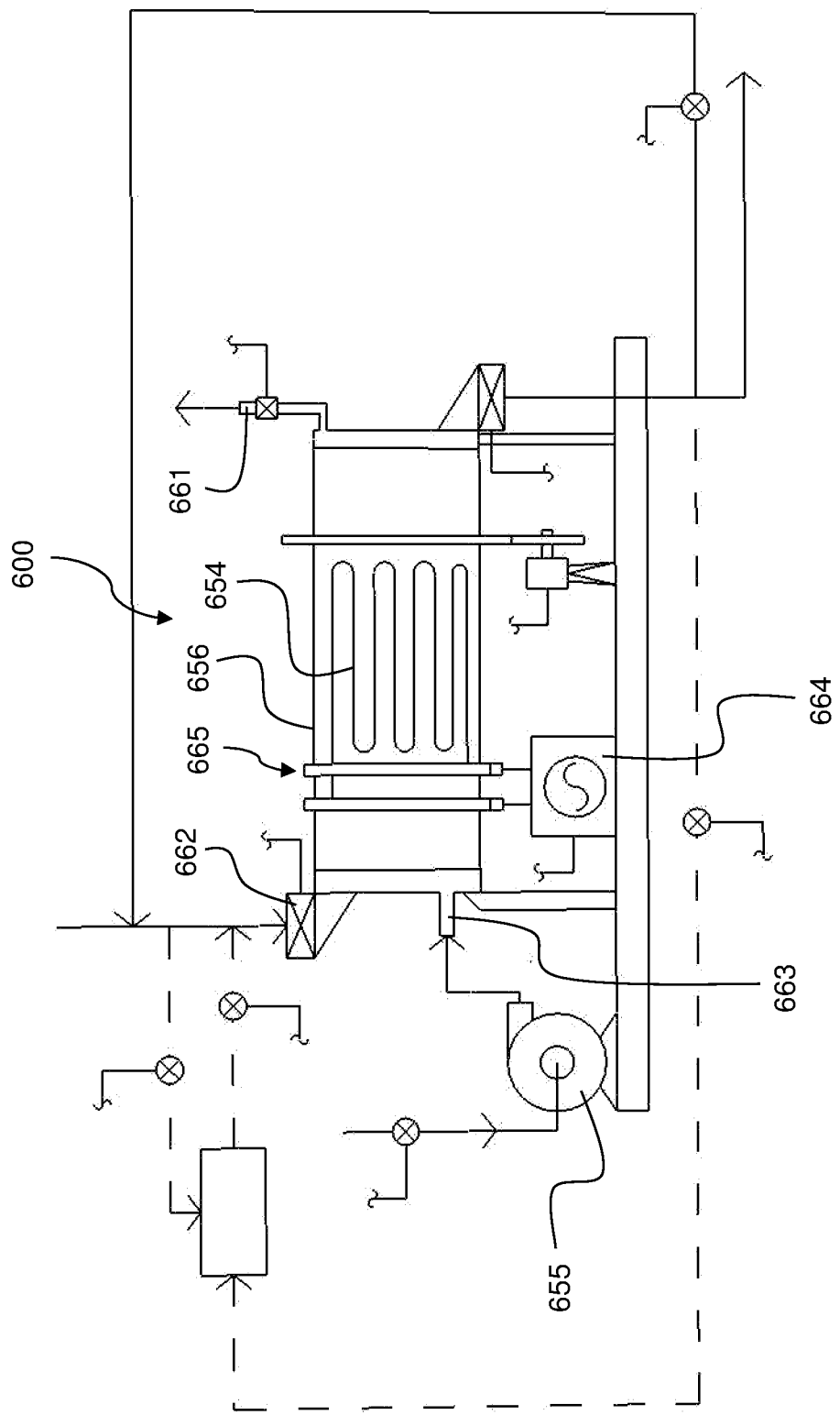
FIG. 8 is a diagrammatic depiction of an alternative type of biochemical decomposition and heating vessel of a rotating drum type that is electrically heated through the drum wall for use in the process for treating sewage sludge in accordance with the present invention.
Figure 9:
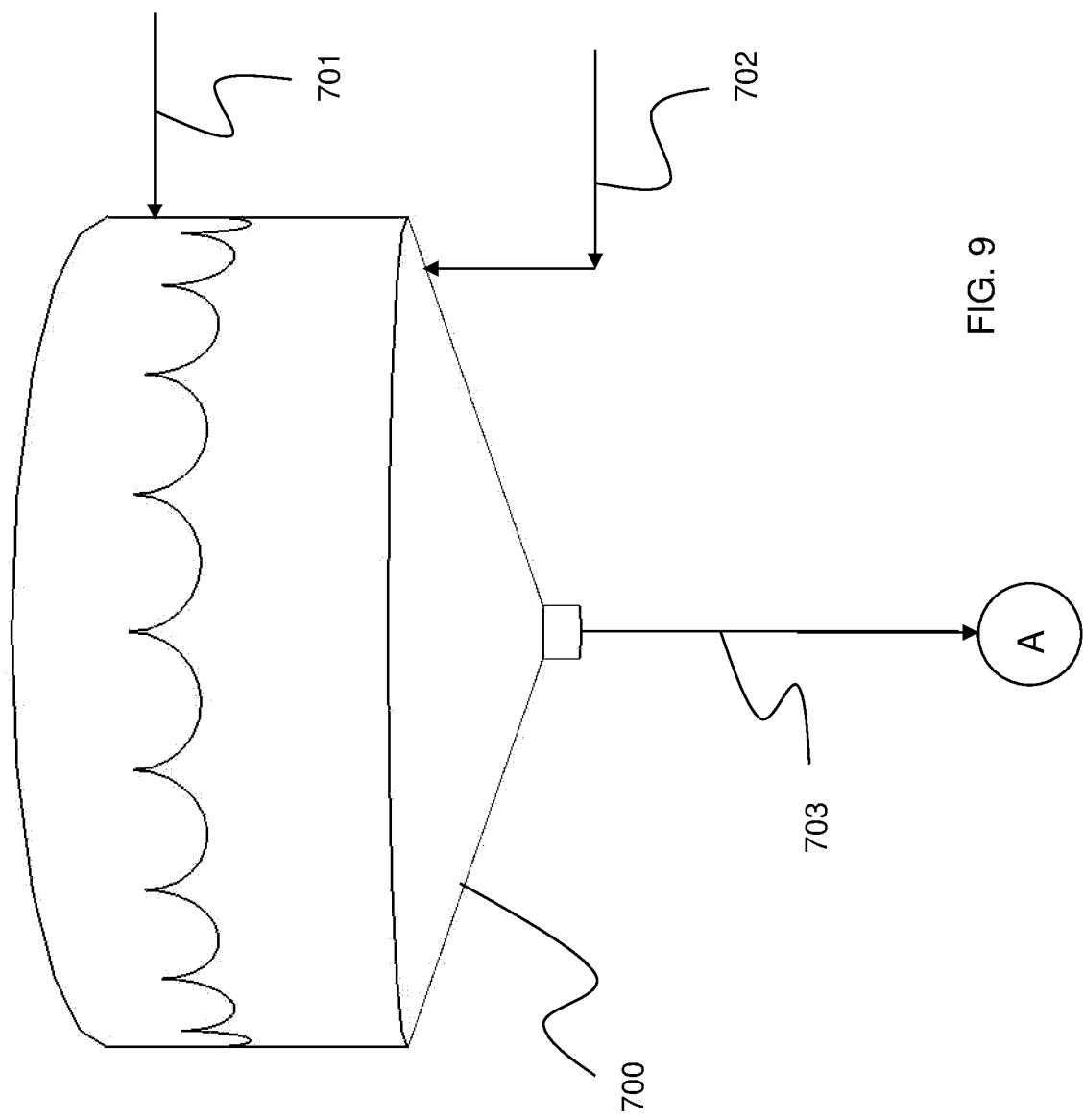
FIGS. 9-14 show an overall schematic view of an apparatus and process for treating sewage sludge in accordance with a further embodiment of the present invention.
Figure 10:
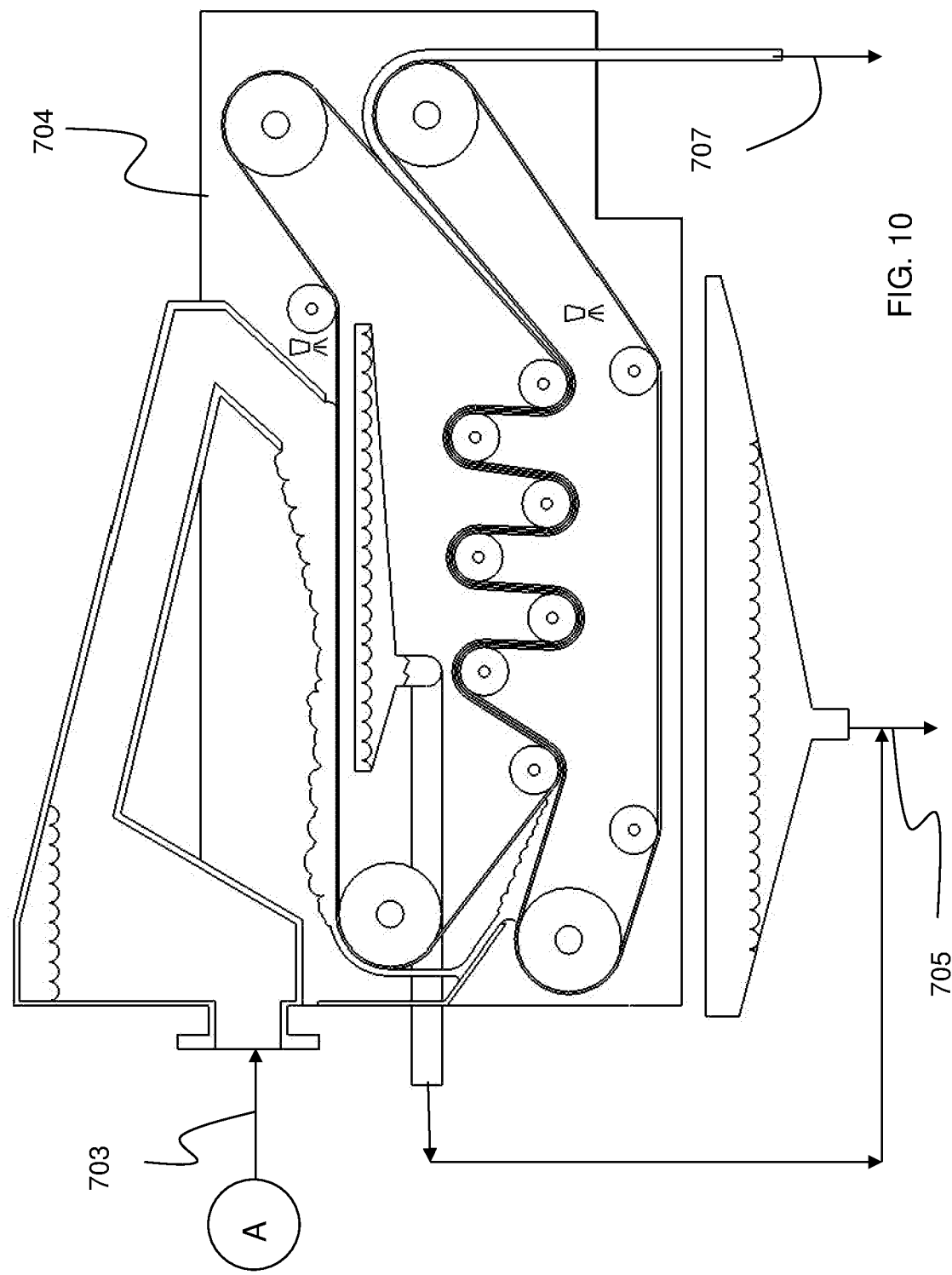
Figure 11:
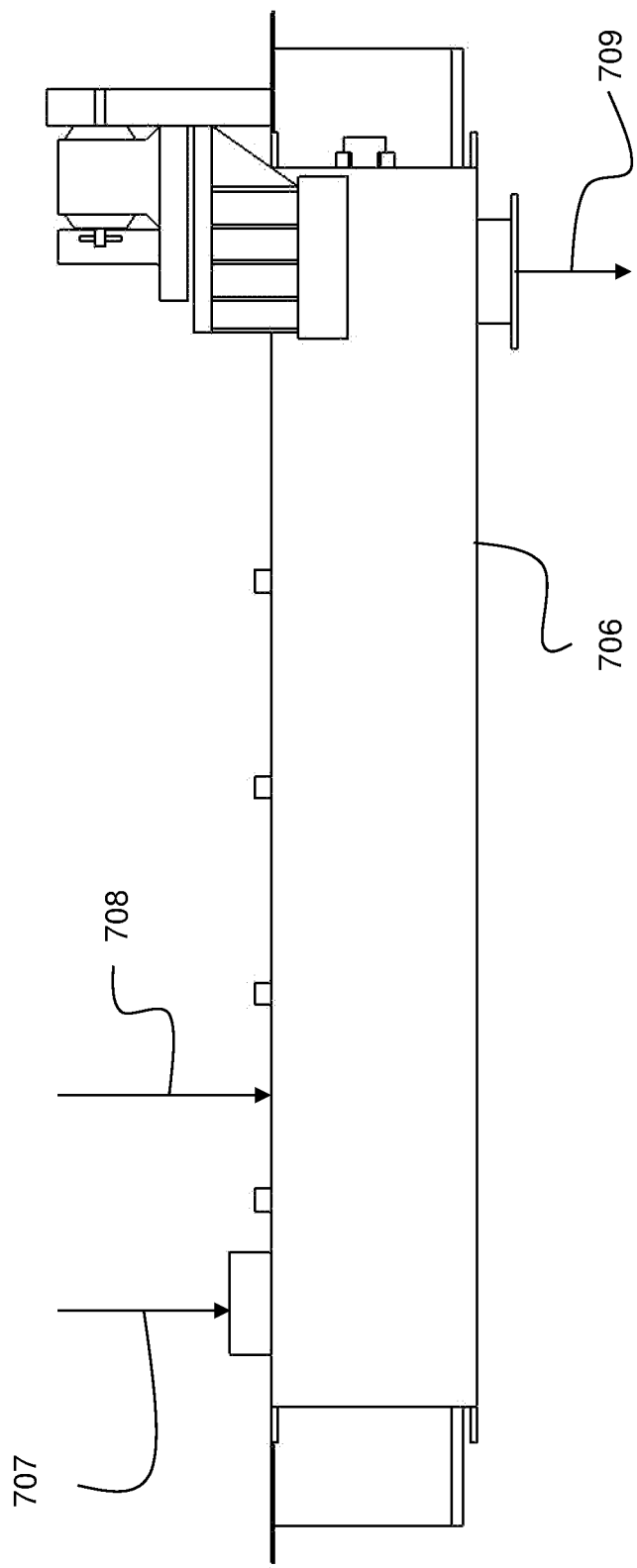
Figure 12:
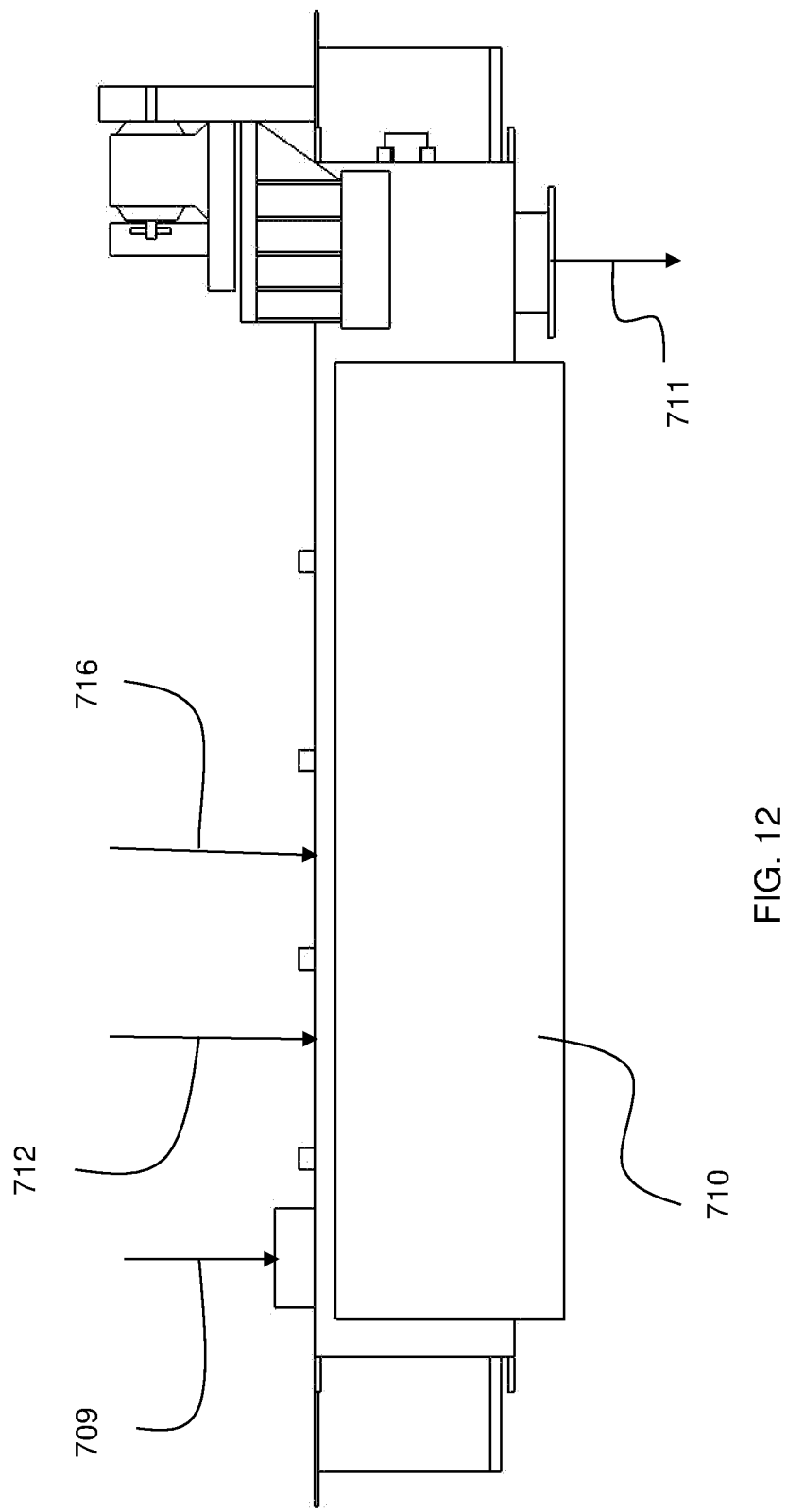
Figure 13:
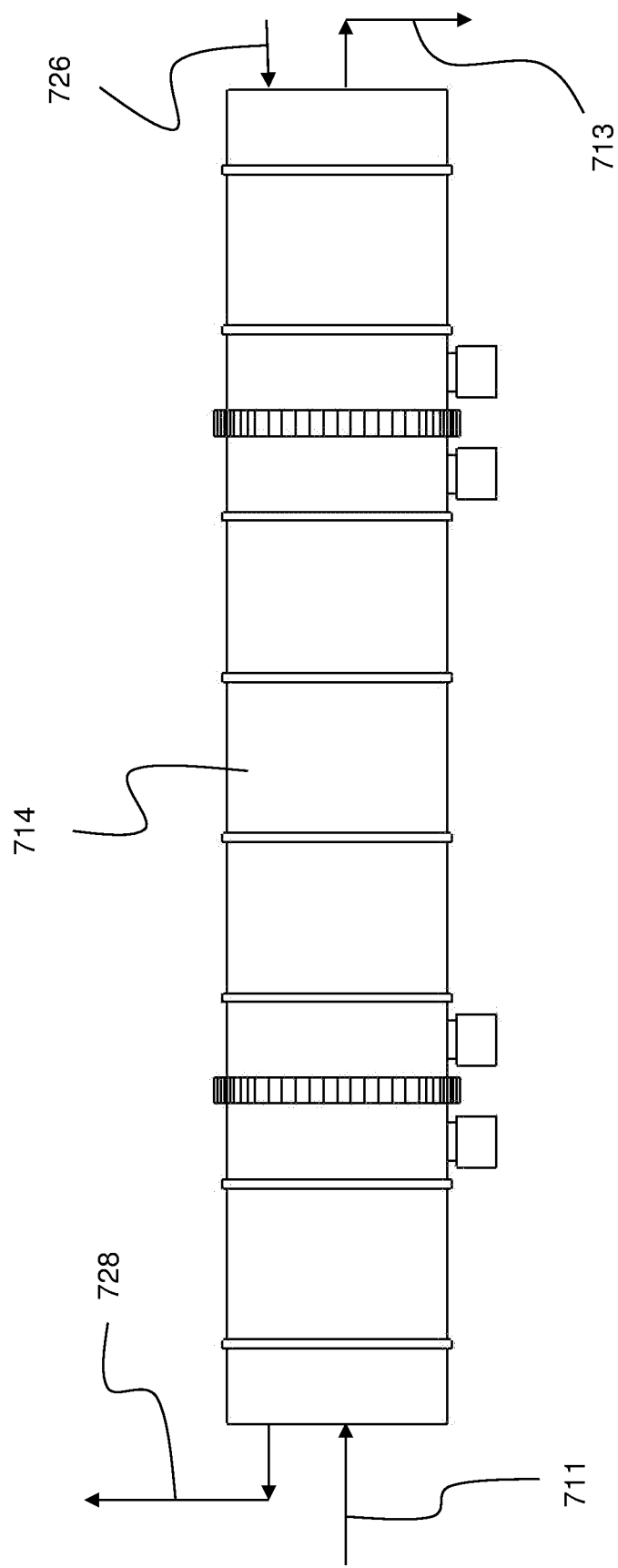
Figure 14:
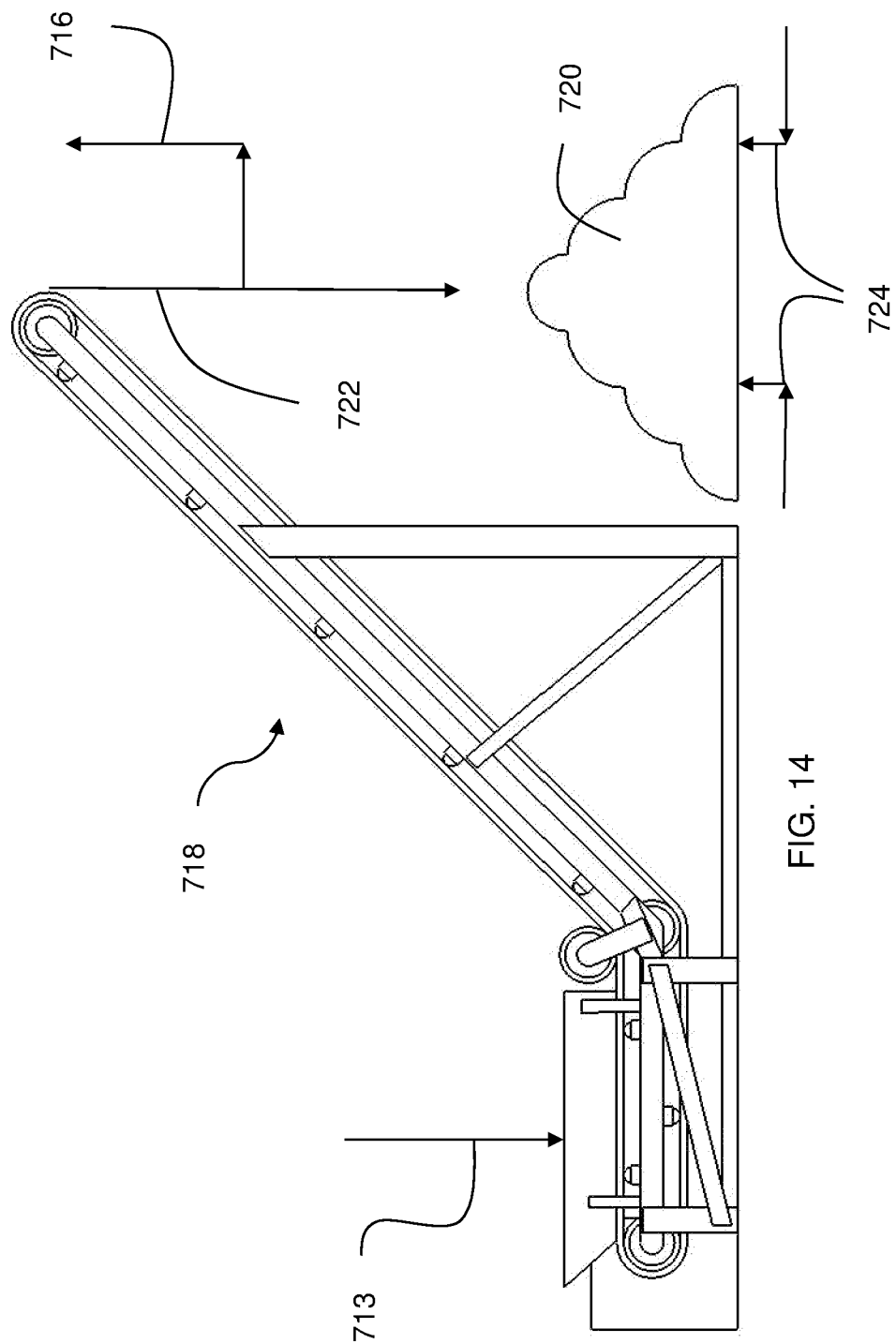

Referring to FIG. 8, a vessel 600 that can be used to perform both the step of biochemically decomposing the material being treated and heating the material being treated to reduce pathogens to required levels can be seen, wherein the agitating means includes a rotating drum 656 with internal radial vanes similar to the internal radial vanes 257 of FIG. 4. The heating means includes one or more electrical heating elements 654 that are attached or embedded in the vessel wall and electrically heat the vessel wall in order to heat the contents of the vessel 600. The power supply 664 is connected to the heating element 654 by a dual ring and brush arrangement 665. The blower 655 supplies air to the side of the vessel 600 farthest from the exhaust 661 through an air inlet 663. The vessel exhaust 661 would be connected to a filter 153 as shown in FIG. 1B. The inlet 662 of the vessel 600 can be connected to the feeder 120 to receive material to be treated from the feeder. A rotating paddle agitator, similar to that of FIGS. 4-7, could be added to the vessel 600, and it could be powered by its own dedicated motor for rotation independent of the drum 656. All the rotating parts in the various embodiments above are rotated by motors via gear, pulley, or chain drive arrangements.

The process of the present invention for treating sewage sludge includes the steps of dewatering the sewage sludge, heating or heat pasteurizing the sewage sludge being treated, and then subjecting the sewage sludge being treated to a biochemical decomposition process to reduce volatile solids. An additional feature of the present invention is that the heating and the biochemical decomposition steps may be performed in the same vessel to reduce capital costs. This process is similar to the process disclosed in U.S. Provisional Application for Patent No. 62/414,011, filed on Oct. 28, 2016, and incorporated by reference herein in its entirety. The present application discloses employing the same vessel for both the heating and for the biochemical decomposition steps.

It is preferred that the product of the process of the present invention is composed of from more than 10 percent to less than 90 percent dry solids. More preferably, the product of the process of the present invention is composed of from about 15 percent to about 85 percent dry solids. Even more preferably, the product of the process of the present invention is composed of from about 50 percent to about 75 percent dry solids. Yet even more preferably, the product of the process of the present invention is composed of from about 55 percent to about 70 percent dry solids. In the illustrated examples, the product of the process of the present invention is composed of about 60 percent dry solids. The product of the process of the present invention would be the decomposition process product for the embodiment of FIGS. 1A-3 if it is desired that no additional finishing, cooling, aging, and/or curing processes be required. The product of the process of the present invention for the embodiment of FIGS. 1A-3 would be the final product of any additional finishing, cooling, aging, and/or curing processes if such additional processes are performed subsequent to the biochemical decomposition step, which may be desirable in some applications.

In a preferred embodiment of the present invention, no addition of slaked lime or quick lime takes place after the step of dewatering the sewage sludge.

The terms "process material," "material being processed," "sewage sludge being treated," "material being treated," and "material undergoing treatment" are used interchangeably herein as generic references to the material undergoing the process of the present invention, which depending upon the point in the process being considered may refer to the sewage sludge, the dewatered sewage sludge or sludge cake, the product of the biochemical decomposition step, the product of the heating step, the product of any additional finishing, cooling, aging, and/or curing processes, the contents of the heating/biochemical decomposition vessel, the content of the dewatering apparatus, any possible mixtures of these, or the material at any point in the process stream of the process of the present invention. The nature of the material being referred to by these generic references should be clear from the context in which the generic reference is being used.

It is preferred to keep the pH of the process material at less than 12 at all times during the process of the present invention. In a preferred embodiment of the present invention, the pH of the process material is about 10 or less at all times during the process of the present invention. In a further preferred embodiment of the present invention, the pH of the process material is less than 10 at all times during the process. Currently, aerobic biochemical decomposition is preferred for use in the process of the present invention.

The vessel used for the heating and biochemical decomposition steps may be of the rotary drum type 110 with a heated agitator as illustrated in FIG. 4. Preferably, the vessel 108, 110 has a heated agitator. Preferably, the vessel 108, 110 is electrically heated, for example, by electrically heating the agitator. Alternatively, the vessel 108, 110, and in turn the material contained in the vessel, may be heated through the wall of the vessel, for example, by electric heating coils embedded in the wall of the vessel.

As another Alternative, the vessel 108, 110 may be provided with a jacket surrounding the wall of the vessel and a heat transfer medium, for example hot oil, hot water, or steam, is circulated through the jacket for heating the material contained in the vessel. As yet another Alternative, the agitator of the vessel 108, 110 may be hollow and a heat transfer medium, for example hot oil, hot water, or steam, is circulated through the agitator for heating the material contained in the vessel.

Additional Embodiments

Referring to FIGS. 9-14, a further embodiment of the present invention can be seen. In this embodiment, a quantity of the sewage sludge is accumulated in a holding tank 700 prior to the step of dewatering the sewage sludge. The sewage sludge in the holding tank is aerated by air supply 702 to the tank prior to the step of dewatering the sewage sludge. Sewage sludge is supplied to the tank 700 from the water treatment plant via line 701.

The sewage sludge may be treated with one or more treating agents selected from a group consisting of an acid, a base, and an oxidant prior to the step of dewatering the sewage sludge for odor control as needed. The acid, base, and oxidant are selected, without limitation, from the group including inorganic acids, organic acids, calcium hydroxide, calcium oxide, ferrous chloride, chlorine dioxide, peracetic acid, hydrogen peroxide, ozone, and sodium hypochlorite.

The step of dewatering the sewage sludge is performed using a filter-belt press 704. Sewage sludge from tank 700 is supplied to the filter-belt press 704 via line 703. The step of heating the dewatered sewage sludge is performed in a heating vessel 706. The water from the dewatering processes is recycled back to the water treatment plant via line 705. The dewatered sludge is conveyed to the heating vessel 706 via the supply stream 707.

The heating vessel 706 is insulated and has an agitator and the dewatered sewage sludge is agitated during the heating step. The heating vessel 706 may be heated using any of the previously described means. The sewage sludge may be treated with one or more treating agents selected from a group consisting of an acid, a base, and an oxidant prior to the aerobic biochemical decomposition process and before, after, or during the heating step through treating agent supply 708 for odor control as needed. The acid, base, or oxidant can be selected, without limitation, from the group including inorganic acids, organic acids, calcium hydroxide, calcium oxide, ferrous chloride, chlorine dioxide, peracetic acid, hydrogen peroxide, ozone, and sodium hypochlorite.

A mixing vessel 710 is provided for mixing the thermally treated and dewatered sewage sludge with the portion of the decomposition process product to form a mixture of the thermally treated and dewatered sewage sludge and the portion of the decomposition process product. The mixing vessel 710 has an agitator to effect mixing the thermally treated and dewatered sewage sludge with the portion of the decomposition process product. The mixture of the thermally treated and dewatered sewage sludge and the portion of the decomposition process product is also cooled in the mixing vessel 710 prior to the aerobic biochemical decomposition process. The mixture of the thermally treated and dewatered sewage sludge and the portion of the decomposition process product is cooled to a temperature of about 150° F. or less prior to the aerobic biochemical decomposition process. The sewage sludge may be treated with one or more treating agents selected from a group consisting of an acid, a base, and an oxidant prior to the aerobic biochemical decomposition process and before, after, or during the mixing and/or cooling step through treating agent supply 712 for odor control as needed. The acid, base, or oxidant can be selected, without limitation, from the group including inorganic acids, organic acids, calcium hydroxide, calcium oxide, ferrous chloride, chlorine dioxide, peracetic acid, hydrogen peroxide, ozone, and sodium hypochlorite.

The aerobic biochemical decomposition process is performed using a rotary drum digester 714. A portion of the decomposition process product is recycled to the mixing vessel 710 via supply line 716. The decomposition process product is supplied to a conveyor 718 for piling into piles 720 for storage and/or further curing. Part of the conveyor output 722 forms the recycle stream 716. Further, curing may be accomplished by air supply 724. Air for the aerobic digestion process is supplied via line 726. The exhaust 728 from the digester 714 is conveyed to a heat recovery process (not shown).

The thermally treated and dewatered sewage sludge is conveyed from the heating vessel 706 to the mixing and cooling vessel 710 via supply stream 709. The mixture of the thermally treated and dewatered sewage sludge and decomposition process product recycle stream is conveyed from the mixing and cooling vessel 710 to the digester 714 via supply stream 711. The decomposition process product is conveyed from the digester 714 to the conveyor 718 via supply stream 713.

The process of the present invention is an Accelerated Aerobic Digestion Process that starts with a series of thermal, and/or chemical and/or aerobic precondition steps. In the simplest form the process of the present invention would include the steps enumerated below.

1. Preconditioning for odors if needed.
2. Dewatering the liquid sewage sludge, which typically has a solids content of 1% to 6%, to obtain a sludge cake having an increased solids content of about 13% or greater. If odors are a problem, the sewage sludge can be treated prior to or during dewatering with acid, base, or oxidants.
3. Treating the dewatered cake with acid, base, oxidants if there is odor. For example, some lime can be added (pH 10 or higher) to suspend biological activity during this step.
4. Supplemental heat (natural gas, biogas, electric, propane, and others) is added for a period of time to weaken the cell walls. When combined with lime some lysing will occur at lower temperatures than the temperatures used in processes currently practiced in the industry.
5. The heated product is cooled to under about 150° F. or less, and mixed with recycled biosolids in a ratio of about 2 parts recycled biosolids to 1 part heated product and then introduced into the Advanced Aerobic Digestion Process (AADP) Step of the process.
6. During the AADP step sufficient air is added to maintain substantially aerobic conditions.
7. A key nutrient, calcium, can be added into the process along with other additives such as societal by products to further transform the product into a more useful form. Sufficient air is added and the temperature controlled to optimize volatile solids destruction.
8. Preconditioning with chemical agents and/or aerobic conditioning before dewatering may be required to prevent odors during processing The process of the present invention begins with preconditioning the sewage sludge to be in an optimal state prior to being introduced into the Advanced Aerobic Digestion Process (AADP) step. The preferred state of the process material going into the Digester for the AADP step should at least meet the following criteria:

a. adjust incoming pH so the pH of the finished product is optimized to about 7,
    b. being mixed with recycled product,
    c. temperature cooled to about less than 150° F.,
    d. moisture content of the feed into the Digester should be at about 50% dry solids,
    e. absence of nuisance or objectionable odors going into the digester for the AADP step.

The Advanced Aerobic Digestion Process step can produce the desired product with or without a bulking agent or other amendments. At times the use of a bulking agent or other amendments may be desirable, however, the simplest form of the process without any amendments, which is a unique aspect of the process of the present invention, will be described first.

The preconditioned material will be mixed with recycled aerobically digested product. Ratios can be varied but 2:1 (recycled: preconditioned sewage sludge) is common. The mixture is introduced into a facultative bed that has sufficient porosity to maintain substantially aerobic conditions. In the simplest form this bed could be an aerobic static pile or windrow. We will first address the simplest form and then address the more automated form which uses a rotating drum to reduce labor cost.

There are many devices that could be used in this process. The rotating Drum concept provides considerable flexibility by controlling key symbiotic relationships:
1. Mixing agitation,
2. Retention time,
3. Adjusting oxygen levels,
4. Controlling temperature,
5. Controlling sufficient porosity to maintain aerobic conditions.

The AADP step can be done with one or multiple zones where the conditions can be varied from zone to zone. After the product exits the drum a portion is sent to recycle and the balance is conveyed to curing/storage steps.

For the most precise process control, a load cell based control system as previously described is preferably used, but process control can also be implemented volumetrically or through timing of process control events. However, load cells are preferred because they provide for more accurate, repeatable, and better process control.

Heat Recovery

The process of the present invention uses an external heat source in the thermal treatment step and utilizes biological decomposition which generates additional heat in the AADP step. The biological activity reduces volume and reduces the moisture content. It is known that this heat can be excessive which adversely affects the digestion process. Therefore, the temperature of the active microbial bed must be maintained within a preferred range. The heat by product can be recovered and used within the process of the present invention. For example, heated air can be used to maintain aerobic conditions in the curing of the finished product. Second the excess heat can be used to keep the treatment plant building warm during the winter months.

The Role of Volatile Solids

Most of the wastewater treatment plants in the United States do not have primary settling tanks. Therefore the sludge has to undergone secondary biological treatment prior to dewatering. As a result most of the volatile solids have already been removed prior to dewatering. This process seeks to achieve an additional 38% additional volatile solids destruction after the preliminary aerobic or anaerobic decomposition via preconditioning the microbes to weaken the cell walls via prior to aerobic digestion of a semi solids sewage sludge cake.

When sewage sludge was heated it would often give off noxious odors. Lime could counteract those odors. The EPA Regulations Part 503 requires a pH greater than 12.0 if lime is to be coupled with Class A Alternative 1 for Pathogens. The resultant end product was very high in lime and therefore not suitable for many land application situations. In accordance with the process of the present invention, a high lime dosage is not required for odor control. In the present inventive process, the lime dosage would result in a product pH of less than 12.0 and typically between 9 and 11. In accordance with the process of the present invention, a little bit of lime can be a good thing. In the past, they overdosed with lime and that is never a good thing.

Aerobic and anaerobic digestion of dewatered sewage sludge cake has historically been plagued with offensive or objectionable odors. The process of the present invention solves that problem through a more complete reduction of volatile solids, which are frequently the root cause of malodors, by lysing the cell walls before the digestion process of a dewatered sludge cake with a solids content of about 13% or higher. At the same time the cell walls are weakened to enhance the subsequent rate of aerobic digestion. If the intra cellular water is not released, then it is unlikely that the process will achieve 38% volatile solids reduction in digestion of the previously aerobically and/or anaerobically decomposed product. This is more efficient and results in an end product with less moisture through biology. Currently, thermal moisture reduction techniques typically rely on fuels like natural gas to evaporate water. The process of the present invention uses aerobic digestion to achieve a final product with a solids content of about 60% or more. Additionally, anaerobic digestion and/or thermal hydrolysis could be used before AADP step.

Also, the sewage sludge can be conditioned with acid, base, or oxidants prior to or during dewatering to produce a cake that is free of objectionable odors and water is removed to produce a semisolid with about 87% water or less. In this form the dewatering operation does not have any objectionable odors.

Historically a bulking agent has been required for the porosity required to maintain aerobic conditions. Windrowing was one technique that was used for aerobic digestion, but this technique requires considerable labor and expense. In the process of the present invention, porosity is needed to maintain aerobic conditions. In the process of the present invention, porosity is achieved through recycling finished product back into the feedstock combined with agitation and/or aeration to maintain aerobic condition. The aerobic digestion can be done as a windrow, forced aeration or a rotating drum.

The Role of Cake Solids

The preconditioned and heated sewage sludge cake coming into the digestion process will typically be about 13% to 40% dry solids. The sludge cake needs to be subsequently mixed with the recycled digestion product prior to being introduced into the digestion step. The ratio of the recycled digestion product to the heated sludge cake will be optimized but generally in the range of 1:1 to 3:1, with 2:1 being a typical ratio of the recycled digestion product to the heated sludge cake.

The Role of pH Adjustment

Adjusting the pH can reduce biological activity during the process by raising the cake pH to inhibit biological activity. This can be done with a nominal amount of alkaline agent to achieve a pH in the range of 8.9 to 11.9, at least about 10 would be recommended if there are odors. This step may not be required.

The pH going into the digester drum is tailored to optimize microbial activity in the digester drum.

The pH in the finished product will typically be around 7 but can be adjusted up or down to effect desired subsequent changes in soil pH in order to promote the growth of acidophiles, neutrophiles or alkaliphilic microorganisms as desired.

The process of the present invention finds a balance of all these requirements. The process of the present invention allows for adjustment to pH to multiple variable levels throughout the process.

Lime plays a dual role of being able to control odors during the post dewatering thermal phases and at the same time it also provides an essential macronutrient, Ca. This is beneficial to enhanced microbial activity. Lime will also weaken the cell walls which lowers the temperature at which cells are lysed. More food becomes available for increased biological activity and volatile solids reduction.

A high calcium, near neutral pH will promote a diverse, highly populated bacterial environment. We use lime to provide a source of calcium while being able to use an acid to reduce the pH to near neutral range around 7 to 8. Because soil pH affects a variety of soil chemical and biological properties, we tailor the finished product to meet the needs dictated by the local soil conditions where the final product is to be used. Soil pH affects the mobility of pollutants in the soil by influencing the rate of their biochemical breakdown and their solubility and adsorption to colloids.

The Role of Temperature

Lysis of cell walls is temperature dependent. When combined with lime the threshold temperature requirement for lysing will be reduced to be between 130° F. to 212° F. Temperature is also used to pasteurize the sewage sludge prior to aerobic digestion stage of the process. Temperatures are in the range of about 130° F. to about 212° F. for a period of 15 seconds or longer during the thermal step of the process. Subsequently the temperature may have to be reduced to about 150° F. before mixing with the recycled aerobic microbial bed material. Temperatures above about 150° F. could adversely affect the microbial population going into the aerobic digestion step.

In the process of the present invention, the dewatered sewage sludge is heated for a time period of about 15 seconds to about 40 minutes during the heating step. More preferably, the dewatered sewage sludge is heated for a time period of about 15 seconds to about 30 minutes during the heating step. In some embodiments, the dewatered sewage sludge is heated for a time period of about 20 minutes or more during the heating step. In an exemplary embodiment, the dewatered sewage sludge is heated for a time period of about 20 minutes during the heating step.

For pasteurization, the EPA has set limits based upon a formula of time and temperature. The process meets or exceeds those requirements to meet the pathogen reduction requirement of the EPA part 503 regulations. The calculation form Alternative I is used to determine the time and temperature requirements for the pasteurization step.

Lysing the cells provides more nutrients for the digestion process. This is critical to meet 38% volatile solids reduction. Lysing is a function of temperature of the thermal step and releases more volatile solids for accelerated decomposition.

The aerobic digestion step is a biological process. In order to stay aerobic, the digestion step requires sufficient air to supply oxygen to the aerobic microbes. If not enough air is present, anaerobic microbes take over leading to foul odors. This digestion step can be operated without a bulking agent so the temperature of compost must be controlled. During the digestion step heat must be taken out to reduce and/or control the temperature. Generally, this is done with air circulation through the digester.

Odors

Odors have been the Achilles Heel of many sewage sludge treatment processes and were a real limiting factor as to the types of processes and equipment that could be employed for sewage sludge treatment prior to the present invention. The process of the present invention addresses odors at every step through a combination of techniques including, but not limited to, the following:
1. Conditioning prior to dewatering if odors are present;
2. Further use of oxidants prior to or after dewatering if odors are present;
3. Produce a friable product with around 50% dry solids with sufficient porosity to substantially maintain aerobic conditions;
4. Provide a mechanism for mixing, such as windrowing or turning in a drum or rotating drum that provides sufficient mixing, and sufficient air to control the aerobic digestion process while maintaining substantially aerobic conditions.

If odors are present before or during the dewatering step, then alkaline/lime can be added, and/or acids, and/or disinfectants such as Peracetic Acid could be added. These chemical would be added to an aerobic conditioning tank, prior to dewatering. In time however these chemicals will wear off and odors can become a problem. Therefore, after dewatering, if odors are present, a bit of lime can be added raise the pH above about 10 to stop biological activity in the sewage sludge in the thermal stage. Alternatively other acids and/or disinfectants could also be used. If there are odors in the aerobic digestions step we can adjust the chemistry and/or the amount of oxygen that is made available to combat odors.

Chemical treating agents suitable for odor control in the process of the present invention include, but are not limited to, inorganic acids, organic acids, calcium hydroxide, calcium oxide, ferrous chloride, chlorine dioxide, peracetic acid, hydrogen peroxide, ozone, and sodium hypochlorite.

The process of the present invention is designed to be a highly efficient aerobic digestion of dewatered sewage sludge cake. First the sewage sludge is preconditioned to optimize the aerobic digestion step of the process. This could include anaerobic digestion or thermal hydrolysis. Second, the preconditioned material is introduced into a facultative microbial bed with sufficient porosity to maintain substantially aerobic conditions.

While in the facultative microbial bed there are provisions to maintain porosity to achieve a high level of volatile solids reduction. After that step has been completed the product is cooled and cured. The final product will then be ready for beneficial use. Ultimately, the key to reducing odors is to achieve the 38% reduction of the volatile solids that were fed into the conditioning tank ahead of dewatering.

How the Present Invention Differs from Prior Art

1. Composting

Dry composting of sewage sludge is known to have tremendous odor issues. The present invention provides a unique preconditioning process to greatly reduce odors by several techniques. First the sewage sludge can be preconditioned before, during or after dewatering. Once in the AADP step sufficient porosity maintains aerobic conditions when combined with ample air supply and proper pH. Calcium may be added to further balance the product of the process.

2. Open Static Pile/Aerated Static Pile Composting/Digestion

These systems typically rely on a bulking agent to provide porosity and some means of turning the pile. The addition of the bulking agent increases the amount of material to be handled. The process of the present invention does not need any additional bulking material to be added. In the process of the present invention, the sewage sludge is thermally conditioned prior to AADP step. Traditional composting operations do not use thermal preconditioning.

The prior art processes use a bulking agent and do not thermally precondition the sewage sludge. They also are designed for much longer retention times. The process of the present invention is a more efficient process and provides a nutrient rich final product.

3. Lime Stabilization

Agitated Bed Reactor IPS or Ewson Digestion Lime stabilized products that achieve high levels killing of pathogens require high dosages of lime. Over-liming dilutes the nutrient value and monetary value of the end product. The process of the present invention does not require lime but if it is added, it will be added in small quantities to trim the pH and optimize the Accelerated Aerobic Digestion Process.

4. Thermal Process

Thermal processes are effective for killing pathogens. The process of the present invention is effective over a wider range of temperatures due to the unique combination of thermal, chemical, and biological aspects of the process. Adding a touch of lime will weaken the cell walls. This facilitates the lysing of the cell walls of the pathogenic organisms at a lower temperature. The additional lysing provides more food sources for the Accelerated Aerobic Digestion and allows greater volatile soils reduction.

5. Cambi Thermal Hydrolysis

The Cambi thermal hydrolysis process lyses the cells and has a high volatile solids reduction. The Cambi process, however, does not produce an end product with more than 50% dry solids content that is friable and in an active microbial state. The process of the present invention produces an end product that is in a more useful form without having to blend with other materials and without further composting through traditional systems.

End Product Considerations

A. Nutrient Rich Product

The end product of the process of the present invention will enhance soil fertility and productivity by altering chemical conditions in the soil. It will have a significantly high amount of beneficial bacteria, organic matter, and available plant nutrients which also improves the quality of the soil. In addition, this product also has the unique ability to also adjust the soil pH up or down to further optimize the soil conditions by satisfying site specific pH requirements while at the same time adding more or less calcium which is a macronutrient. Finally, this product will increase the microbial population of the soil with good microbes. The product also provides the new and existing microbes with a supply of food for a period of time because of the dead and decaying microorganisms that are contained in the end product.

Organic matter is made up of living, dead, and decaying components. The living parts are the microorganisms. The dead also includes unconsolidated weathered minerals. Humus is dark in color, made of already decomposed or dead parts of plants and animals. Once broken down by microorganisms, these dead residuals are decomposed and mineralized into useable nutrients. The more organic matter the more nutrients in the soil and the more nutrients it can retain. The product of the present invention can put 20 to 30 pounds of nitrogen, 4.5 to 6.6 pounds of $P_2O_5$, and 2 to 3 pounds of sulfur per year into the soil. The numerical value used to express the significant fact in determining soil quality for any soil is based on the amount of organic matter. All degraded soils lack soil organic matter. organic matter influences the chemical, physical, and biological properties of soil. This material is defined by being made up of 50% or more of organic carbon. Soil organic matter is crucial for the microorganism in the soil. When found in a biologically available form, it helps the number, productivity, and diversity of the microbes. The increase in "good" microbes keeps the "bad" microbes in check which insures a healthy soil into the future. The product of the present invention has a higher density of active microbes than previous biosolids derived products. Therefore there is a proportional improvement in nutrient retention, soil structure, and water holding capacity. Furthermore, the net increase in active microbial organisms combined with a more nutrient rich organic matter content also provides an increase in aeration, temperature, moisture, and aggregate stability than was previously available from other biosolids derived aerobically digested products. The more organic matter that there is in the soil the healthier the soil, and this product provides more active microbes in a more nutrient rich medium than previous products. Soil aggregates often provide even smaller pores where bacterial cells can hide to escape predation. Organic matter helps to maintain soil pH stability and provides sites for storing nutrients for plants to use. It can make soils more acid because it forms compounds that can dissolve calcium and magnesium, which can then be leached out. It also has acid functional groups that dissociate hydrogen ions in the soil. In humid regions a program of regular organic matter additions could include regular additions of an intentionally higher pH product to counteract this acidification. Microorganisms are in intense competition with each other for food, therefore even adding the smallest amount of food can stimulate microbial growth. In the case of the product of the present invention, the food source is more balanced than other products and macronutrients such as calcium can be added to enhance the effectiveness of the product to sequester more carbon into the soil than previous products.

The physical properties of a soil have a significant impact on how that soil functions in its ecosystem and how it should be handled. The product of the present invention will make clay soils more porous, bring more air to the roots, and help in regulating the temperature of the soil. It will help sandy soil retain more water for roots to uptake as needed. This product will interact with the soil particles binding them into soil aggregates continuing to improve the structure of the soil. This product has complex molecules with carbon atoms that are bonded to hydrogen, oxygen, and nitrogen. Because of its large colloidal surface area and large amount of hydrophilic groups, the product of the present invention has a high capacity to adsorb water. This ability to hold water protects plants from drought conditions. It contains both negatively and positively charged particles to attract both anions and cations for the plant to use. This allows the soils to hold onto a large amount of nutrients while also acting as a natural filter for groundwater. The colloids delay downward movement of chemicals giving the soil microbes more time to decompose the harmful compounds. This product enables the regulation of soil pH to optimize the positive effects which in turn optimize virtually all aspects of the soil like nutrient availability, type of colloids, buffering capacity, microbial activity, and more. This product adds food that feeds the soil food web, giving food to the microbes and soil animals that then positively influence the growth of crops. Adding the product of the present invention to the soil will add carbon to soil both for continuing the natural carbon cycle and for long-term sequestration of carbon, which should help mitigate climate change due to the accumulation of greenhouse gases in the atmosphere.

Regulatory Compliance

The process of the present invention can be operated so as to be compliant with current applicable regulatory requirements set forth in 40 C.F.R. § 503.32 (a)(3) for pathogen reduction via Alternative 1 (see equation 2 above) and in 40 C.F.R. § 503.33(b)(1) for vector attraction reduction via Option 1 (at least 38% reduction in volatile solids).

Concluding Remarks

The process of the present invention is a highly efficient process for treating domestic sewage sludge with or without other societal byproducts that can be implemented in a relatively small footprint. The process of the present invention is a sequential multistep process that includes a preconditioning thermal step which offers a wider temperature range than the temperatures required by 40 C.F.R. § 503 (a number from a negative standard deviation of 80% up through and above the required temperature based on Equation 2 above). Note that operating the process at temperatures below the required temperature in accordance with Equation 2 will require prior separately obtained regulatory approval, which requires an experimental showing that operating the process at the alternative temperature provides the required level of pathogen reduction to meet class A or other applicable regulatory standards. The thermal step may be combined with a preconditioning chemical step, before and/or after the thermal step to control offensive odors and/or enhance the nutrient value of the end product.

Following the preconditioning thermal step is an aerobic digestion step that does not require an additional bulking agent to maintain aerobic digestion conditions. Separately, there may be another preconditioning prior to the dewatering step to further enhance the thermal step, which may include chemical treatment and/or aerobic digestion. The finished product is stable because at least 38% of the volatile solids have been destroyed across the entire multi step process without objectionable odors.

It will be apparent form the foregoing that various modifications may be made in the apparatus described above, as well as in the process steps, as may suggest themselves to those skilled in the art, upon a reading of this specification, all within the spirit and scope of the present invention as defined in the appended claims.

The invention claimed is:

1. A process for treating liquid sewage sludge, to produce an end product that is an active bed of aerobic microorganisms, the active bed being in various stages of decay, the process comprising:
   (a) providing liquid sewage sludge,
   (b) biologically stabilizing the liquid sewage sludge,
   (c) dewatering the liquid sewage sludge to from about 15 percent to about 50 percent dry solids content,
   (d) applying heat to the dewatered liquid sewage sludge to a temperature at least as great as required by EPA 503 regulations for Class A Product Pathogen Reduction to provide preconditioned, dewatered liquid sewage sludge,
   (e) providing aerobically digested sewage sludge,
   (f) mixing the preconditioned, dewatered liquid sewage sludge with the aerobically digested sewage sludge to provide feed for aerobic digestion,
   (g) aerobically digesting the feed for aerobic digestion by mixing the feed while aerating the feed with sufficient air to maintain aerobic conditions to control odor to provide aerobically digested sludge and exhaust air,
   (h) recycling a portion of the aerobically digested sludge produced in step (g) and thus provide the aerobically digested sewage sludge in step (e) for mixing with the preconditioned, dewatered liquid sewage sludge in step (f),
   (i) curing a portion of the aerobically digested sludge, and
   (j) mixing odor control chemicals with the liquid sewage sludge.

2. A process according to claim 1, further comprising mixing the one or more odor control chemicals with the biologically stabilized liquid sewage sludge stabilized in step (b) to improve the efficiency of the process and control odors.

3. A process according to claim 2, wherein the one or more odor control chemicals comprise chemicals selected from the group consisting of ferric chloride, lime, acid, base and oxidants, and combinations thereof.

4. A process according to claim 1, further comprising mixing the one or more odor control chemicals with the dewatered liquid sewage sludge provided in step (c) to improve the efficiency of the process and control odors.

5. A process according to claim 4, wherein the one or more odor control chemicals comprise chemicals selected from the group consisting of ferric chloride, lime, acid, base and oxidants, and combinations thereof.

6. A process according to claim 1 further comprising mixing the one or more odor control chemicals with the preconditioned, dewatered liquid sewage sludge provided in step (c) to control odors.

7. A process according to claim 6 wherein the one or more odor control chemicals are selected from the group consisting of inorganic acids, organic acids, calcium hydroxide, calcium oxide, ferrous chloride, chlorine dioxide, peracetic acid, hydrogen peroxide, ozone, and sodium hypochlorite.

8. Apparatus for treating liquid sewage sludge, the apparatus comprising:
   (a) a holding tank for holding liquid sewage sludge,
   (b) a dewatering device for receiving the liquid sewage sludge and dewatering the liquid sewage sludge to from about 15 percent to about 50 percent dry solids content to provide a dewatered sewage sludge, (c) an aerobic digester for receiving a material including the dewatered sewage sludge and aerobically digesting the dewatered sewage sludge to provide aerobically digested sludge, (d) means for separating a portion of the aerobically digested sludge, (e) a mixer for mixing the separated portion of the aerobically digested sludge with the dewatered sewage sludge to provide a material including the dewatered sewage sludge, (f) means for providing the material including the dewatered sewage sludge to the aerobic digester, and (g) means for providing air to the aerobic digester, wherein the aerobic digester includes a rotatable drum, and wherein the rotatable drum includes at least two independently controllable segments.

9. Apparatus according to claim 8 wherein the aerobic digester includes at least two stages.

10. Apparatus according to claim 8 wherein the aerobic digester includes single or dual mixing shafts and an auger for conveying the material.

11. Apparatus according to claim 8 wherein each segment includes a rotatable drum segment.

12. Apparatus according to claim 11 wherein the rotation of each drum segment is controlled by a variable frequency drive.

13. Apparatus according to claim 8, wherein the drum is rotatable in either or both directions.

14. Apparatus according to claim 8, wherein the frequency, duration and speed of rotation of the drum can be adjusted.

* * * * *

UNITED STATES PATENT AND TRADEMARK OFFICE
CERTIFICATE OF CORRECTION

| | |
|---|---|
| PATENT NO. | : 12,006,241 B2 |
| APPLICATION NO. | : 17/709600 |
| DATED | : June 11, 2024 |
| INVENTOR(S) | : Richard W. Christy |

It is certified that error appears in the above-identified patent and that said Letters Patent is hereby corrected as shown below:

In the Claims
Column 36, Line 33, after "mixing" insert -- one or more --

Signed and Sealed this
Sixteenth Day of July, 2024

Katherine Kelly Vidal
*Director of the United States Patent and Trademark Office*